(12) United States Patent
Bailey et al.

(10) Patent No.: US 12,186,596 B2
(45) Date of Patent: Jan. 7, 2025

(54) LOCK-OFF DESCENT CONTROL SYSTEMS AND DEVICES

(71) Applicant: TruBlue LLC, Boulder, CO (US)

(72) Inventors: Carl Andrew Bailey, Boulder, CO (US); Marc Reich, Boulder, CO (US); Ryan Daniel Walker, Boulder, CO (US); Nolan Hurd, Boulder, CO (US); Stefan Stahl, Boulder, CO (US); Joseph Cinderella, Boulder, CO (US)

(73) Assignee: TruBlue LLC, Louisville, CO (US)

( * ) Notice: Subject to any disclaimer, the term of this patent is extended or adjusted under 35 U.S.C. 154(b) by 1056 days.

(21) Appl. No.: 17/025,040

(22) Filed: Sep. 18, 2020

(65) Prior Publication Data

US 2021/0086002 A1    Mar. 25, 2021

Related U.S. Application Data

(60) Provisional application No. 63/021,423, filed on May 7, 2020, provisional application No. 62/903,385, filed on Sep. 20, 2019.

(51) Int. Cl.
*A62B 1/08* (2006.01)
*F16D 49/08* (2006.01)
(Continued)

(52) U.S. Cl.
CPC .............. *A62B 1/08* (2013.01); *F16D 59/00* (2013.01); *F16D 63/002* (2013.01);
(Continued)

(58) Field of Classification Search
CPC .. A62B 1/08; A62B 1/10; F16D 59/00; F16D 63/002; F16D 49/08; F16D 55/02;
(Continued)

(56) References Cited

U.S. PATENT DOCUMENTS 2,058,024 A    10/1936    Logan
2,112,312 A     6/1938    Cassion
(Continued)

FOREIGN PATENT DOCUMENTS

CN    1783674    6/2006
CN    202203305    8/2011
(Continued)

OTHER PUBLICATIONS

KEB America, Electromagnetic Brakes (Power-on), Aug. 18, 2015, https://youtu.be/RNdXn2ecOWI?si=KS1r0qz3CjosvsKe (Year: 2015).*
(Continued)

*Primary Examiner* — Brian D Mattei
*Assistant Examiner* — Jacob G Sweeney
(74) *Attorney, Agent, or Firm* — Merchant & Gould P.C.

(57) ABSTRACT

An automatic descent control device includes a line configured to be attached to a load. A line system retracts slack from the line when the line is not loaded and extends the line when the line is loaded. At least one braking system provides a braking force when the line is loaded so as to control extension of the line and a descent rate of the load. The at least one braking system is operable in at least two configurations, a first configuration that the at least one braking system lowers the load at a first descent rate, and a second configuration that the at least one braking system lowers or locks the load at a second descent rate. The load being a constant and the first descent rate is greater than the second descent rate.

16 Claims, 21 Drawing Sheets

(51) Int. Cl.
  *F16D 55/02*  (2006.01)
  *F16D 55/225*  (2006.01)
  *F16D 59/00*  (2006.01)
  *F16D 63/00*  (2006.01)
  *F16D 121/20*  (2012.01)
  *H02K 49/04*  (2006.01)

(52) U.S. Cl.
  CPC ........... *H02K 49/046* (2013.01); *F16D 49/08* (2013.01); *F16D 55/02* (2013.01); *F16D 55/225* (2013.01); *F16D 63/008* (2013.01); *F16D 2121/20* (2013.01)

(58) Field of Classification Search
  CPC .. F16D 55/225; F16D 63/008; F16D 2121/20; H02K 49/046
  See application file for complete search history.

(56) References Cited

U.S. PATENT DOCUMENTS

| | | |
|---|---|---|
| 2,122,315 A | 6/1938 | Fosty et al. |
| 2,409,009 A | 10/1946 | Bakke |
| 2,428,104 A | 9/1947 | Winther |
| 2,438,223 A * | 3/1948 | Lear .......... F16D 67/06 |
| | | 192/18 R |
| 2,492,776 A | 12/1949 | Winther |
| 2,771,171 A | 11/1956 | Schultz |
| 3,364,795 A | 1/1968 | De Coye De Castelet |
| 3,447,006 A | 5/1969 | Bair |
| 3,721,394 A | 3/1973 | Reiser |
| 3,946,989 A | 3/1976 | Tsuda |
| 3,962,595 A | 6/1976 | Eddens |
| 3,967,794 A | 7/1976 | Fohl |
| 4,078,719 A | 3/1978 | Durland |
| 4,093,186 A | 6/1978 | Golden |
| 4,224,545 A | 9/1980 | Powell |
| 4,271,944 A | 6/1981 | Hanson |
| 4,306,688 A | 12/1981 | Hechler, IV |
| 4,416,430 A | 11/1983 | Totten |
| 4,434,971 A | 3/1984 | Cordrey |
| 4,511,123 A | 4/1985 | Ostrobrod |
| 4,544,111 A | 10/1985 | Nakajima |
| 4,561,605 A | 12/1985 | Nakajima |
| 4,567,963 A | 2/1986 | Sugimoto |
| 4,601,438 A | 7/1986 | Young |
| 4,612,469 A | 9/1986 | Muramatsu |
| 4,690,066 A | 9/1987 | Morishita |
| 4,877,110 A | 10/1989 | Wolner |
| 4,934,501 A * | 6/1990 | Gay .......... G01P 3/443 |
| | | 192/70.27 |
| 4,938,435 A | 7/1990 | Varner et al. |
| 4,957,644 A | 9/1990 | Price |
| 5,054,587 A | 10/1991 | Matsui |
| 5,064,029 A | 11/1991 | Araki et al. |
| 5,205,386 A | 4/1993 | Good man et al. |
| 5,342,000 A | 8/1994 | Berges et al. |
| 5,351,908 A | 10/1994 | Umezawa |
| 5,441,137 A | 8/1995 | Organek |
| 5,447,280 A | 9/1995 | Feathers |
| 5,465,815 A | 11/1995 | Ikegami |
| 5,636,804 A | 6/1997 | Jeung |
| 5,692,693 A | 12/1997 | Yamaguchi |
| 5,711,404 A | 1/1998 | Lee |
| 5,712,520 A | 1/1998 | Lamb |
| 5,722,612 A | 3/1998 | Feathers |
| 5,742,986 A | 4/1998 | Corrion |
| 5,779,178 A | 7/1998 | McCarty |
| 5,791,584 A | 8/1998 | Kuriowa |
| 5,822,874 A | 10/1998 | Nemes |
| 5,862,891 A | 1/1999 | Kroger |
| 5,928,300 A | 7/1999 | Rogers |
| 6,041,897 A | 3/2000 | Saumweber |
| 6,042,517 A | 3/2000 | Gunther |
| 6,051,897 A | 4/2000 | Wissler |
| 6,062,350 A | 5/2000 | Spieldiener |
| 6,086,005 A | 7/2000 | Kobayashi et al. |
| 6,279,682 B1 | 8/2001 | Feathers |
| 6,293,376 B1 | 9/2001 | Pribonic |
| 6,360,855 B1 | 3/2002 | Szu-Yin |
| 6,412,611 B1 | 7/2002 | Pribonic |
| 6,460,828 B1 | 10/2002 | Gersemsky |
| 6,553,083 B1 | 3/2003 | Pribonic |
| 6,523,650 B1 | 5/2003 | Pribonic |
| 6,557,673 B1 | 5/2003 | Desta |
| 6,561,451 B1 | 5/2003 | Steinich |
| 6,585,087 B2 | 7/2003 | Lin |
| 6,659,237 B1 | 12/2003 | Pribonic |
| 6,756,870 B2 | 6/2004 | Kuwahara |
| 6,793,203 B2 | 9/2004 | Heinrichs et al. |
| 6,810,997 B2 | 11/2004 | Schreiber |
| 6,918,469 B1 | 9/2005 | Pribonic |
| 6,962,235 B2 | 11/2005 | Leon |
| 6,973,999 B2 | 12/2005 | Ikuta |
| 7,011,607 B2 | 3/2006 | Kolda et al. |
| 7,014,026 B2 | 3/2006 | Drussel |
| 7,018,324 B1 | 3/2006 | Lin |
| 7,279,055 B2 | 10/2007 | Schuler |
| 7,281,612 B2 | 10/2007 | Hsieh |
| 7,281,620 B2 | 10/2007 | Wolner |
| 7,513,334 B2 | 4/2009 | Calver |
| 7,528,514 B2 | 5/2009 | Cruz et al. |
| 7,870,934 B2 | 1/2011 | Ecker |
| 7,918,323 B2 | 4/2011 | Kuo |
| 7,894,796 B2 | 7/2011 | Pribonic |
| 8,272,476 B2 | 9/2012 | Hartman |
| 8,408,360 B2 | 4/2013 | Postma |
| 8,424,460 B2 | 4/2013 | Lemer |
| 8,490,751 B2 | 7/2013 | Allington et al. |
| 8,511,434 B2 | 8/2013 | Blomberg |
| 8,556,234 B2 | 10/2013 | Hartman |
| 8,567,561 B2 | 10/2013 | Strasser et al. |
| 8,601,951 B2 | 12/2013 | Lemer |
| 8,851,235 B2 | 10/2014 | Allington |
| 8,893,854 B2 | 11/2014 | Casebolt |
| 8,991,556 B2 | 3/2015 | Auston |
| 9,016,435 B2 | 4/2015 | Allington et al. |
| 9,121,462 B2 | 9/2015 | Casebolt |
| 9,199,103 B2 | 12/2015 | Hetrich |
| 9,242,128 B2 | 1/2016 | Macy |
| 9,413,218 B2 | 8/2016 | Lo |
| 9,427,607 B2 * | 8/2016 | Renton .......... A62B 1/10 |
| 9,764,172 B2 | 9/2017 | Wolner |
| 9,962,588 B2 | 5/2018 | Allington et al. |
| 10,020,720 B2 | 7/2018 | Diehl |
| 10,022,570 B2 | 7/2018 | Krupp |
| 10,065,054 B2 | 9/2018 | Allington |
| 10,333,378 B2 | 6/2019 | Lerner |
| 10,426,982 B2 | 10/2019 | Bornack |
| 10,518,115 B2 | 12/2019 | Allington |
| 10,661,106 B2 | 5/2020 | Choate |
| 11,123,580 B2 | 9/2021 | Allington |
| 11,938,350 B2 | 3/2024 | Jones |
| 2002/0162477 A1 | 11/2002 | Palumbo |
| 2002/0179372 A1 | 12/2002 | Schreiber et al. |
| 2003/0116391 A1 | 6/2003 | Desta |
| 2003/0158016 A1 | 8/2003 | Kolda et al. |
| 2003/0211914 A1 | 11/2003 | Perkins |
| 2004/0055836 A1 | 3/2004 | Pribonic |
| 2004/0073346 A1 | 4/2004 | Roelleke |
| 2004/0168855 A1 | 9/2004 | Leon |
| 2004/0194101 A1 | 9/2004 | Bytnar |
| 2005/0117258 A1 | 6/2005 | Ohta |
| 2005/0189830 A1 | 9/2005 | Corbin, III |
| 2005/0263356 A1 | 12/2005 | Marzano |
| 2006/0278478 A1 | 12/2006 | Pribonic |
| 2007/0000741 A1 | 1/2007 | Pribonic |
| 2007/0001048 A1 | 1/2007 | Wooster |
| 2007/0135561 A1 | 6/2007 | Rath |
| 2007/0215410 A1 | 9/2007 | Ecker |
| 2007/0228202 A1 | 10/2007 | Scharf et al. |
| 2007/0228713 A1 | 10/2007 | Takemura |
| 2007/0256906 A1 | 11/2007 | Feng |
| 2008/0059028 A1 | 3/2008 | Willeron |

(56) References Cited

U.S. PATENT DOCUMENTS

| | | |
|---|---|---|
| 2008/0074223 A1 | 3/2008 | Pribonic |
| 2008/0087510 A1 | 4/2008 | Pribonic |
| 2008/0105503 A1 | 5/2008 | Pribonic |
| 2008/0106420 A1 | 5/2008 | Rohlf |
| 2008/0135579 A1 | 6/2008 | Bertram |
| 2009/0026303 A1 | 1/2009 | Schmitz et al. |
| 2009/0032785 A1 | 2/2009 | Jones |
| 2009/0084631 A1 | 4/2009 | Casebolt |
| 2009/0084883 A1 | 4/2009 | Casebolt |
| 2009/0114892 A1 | 5/2009 | Lesko |
| 2009/0166459 A1 | 7/2009 | Niitsuma et al. |
| 2009/0178887 A1 | 7/2009 | Reeves et al. |
| 2009/0211846 A1 | 8/2009 | Taylor |
| 2009/0249712 A1* | 10/2009 | Brickell ............... A62B 1/10 182/8 |
| 2010/0032255 A1 | 2/2010 | Conti |
| 2010/0065373 A1 | 3/2010 | Stone et al. |
| 2010/0112224 A1 | 5/2010 | Lott |
| 2010/0116922 A1 | 5/2010 | Choate |
| 2010/0211239 A1 | 8/2010 | Christensen et al. |
| 2010/0224448 A1 | 9/2010 | Wolner |
| 2010/0226748 A1* | 9/2010 | Wolner ............. A62B 35/0093 414/815 |
| 2011/0073697 A1 | 3/2011 | Koh |
| 2011/0084158 A1 | 4/2011 | Meillet |
| 2011/0114907 A1 | 5/2011 | Hartman |
| 2011/0147125 A1 | 6/2011 | Blomberg |
| 2011/0174914 A1 | 7/2011 | Yang |
| 2011/0175473 A1 | 7/2011 | Kitabatake |
| 2011/0240403 A1 | 10/2011 | Meillet |
| 2011/0297778 A1 | 12/2011 | Meillet |
| 2012/0055740 A1 | 3/2012 | Allington et al. |
| 2012/0118670 A1 | 5/2012 | Olson |
| 2012/0312540 A1 | 12/2012 | Lefebvre |
| 2013/0048422 A1 | 2/2013 | Hartman |
| 2013/0087433 A1 | 4/2013 | Sejourne |
| 2013/0118842 A1 | 5/2013 | Lerner |
| 2013/0140112 A1* | 6/2013 | Walter ............... B61H 11/14 188/58 |
| 2013/0186721 A1 | 7/2013 | Bogdanowicz et al. |
| 2014/0048639 A1 | 2/2014 | Allington |
| 2014/0110947 A1 | 4/2014 | Mongeua |
| 2014/0224597 A1 | 8/2014 | Takezawa |
| 2014/0346909 A1 | 11/2014 | Vogler |
| 2014/0375158 A1 | 12/2014 | Allington |
| 2015/0266454 A1 | 9/2015 | McGowan |
| 2015/0352380 A1 | 12/2015 | Huang |
| 2016/0317936 A1 | 11/2016 | Diehl |
| 2016/0360738 A1 | 12/2016 | Richardson |
| 2017/0237313 A1 | 8/2017 | Diehl |
| 2017/0274261 A1 | 9/2017 | Allington |
| 2017/0328424 A1 | 11/2017 | Allington |
| 2017/0333735 A1 | 11/2017 | Krupp |
| 2017/0338728 A1 | 11/2017 | Diehl |
| 2018/0221743 A1 | 8/2018 | Allington et al. |
| 2018/0296860 A1 | 10/2018 | Krupp |
| 2019/0015687 A1 | 1/2019 | Knickrehm |
| 2019/0109528 A1 | 4/2019 | Lerner |
| 2019/0275356 A1 | 9/2019 | Jones |
| 2021/0290986 A1 | 9/2021 | Bailey |

FOREIGN PATENT DOCUMENTS

| | | |
|---|---|---|
| CN | 102497085 | 6/2012 |
| CN | 102627063 | 8/2012 |
| CN | 103244577 | 4/2013 |
| CN | 103326538 | 9/2013 |
| CN | 209253971 U | 8/2019 |
| DE | 9300966 | 3/1993 |
| DE | 102005032694 | 1/2007 |
| EP | 460494 | 12/1991 |
| EP | 1244565 | 10/2002 |
| EP | 1401087 | 3/2004 |
| EP | 1432101 | 6/2004 |
| EP | 1480320 | 11/2004 |
| EP | 1564868 | 8/2005 |
| EP | 2359911 | 8/2011 |
| EP | 3002045 | 4/2016 |
| GB | 721748 | 1/1955 |
| GB | 908128 | 10/1962 |
| GB | 2352644 | 2/2001 |
| GB | 2352645 | 2/2001 |
| GB | 2352784 | 2/2001 |
| GB | 2357563 | 6/2001 |
| JP | H-05296287 | 11/1993 |
| JP | 10098868 | 4/1998 |
| JP | 10140536 | 5/1998 |
| JP | 8252025 | 9/1998 |
| JP | 10252025 | 9/1998 |
| JP | 11119680 | 4/1999 |
| JP | 11189701 | 7/1999 |
| JP | 11315662 | 11/1999 |
| JP | 2000-316272 | 11/2000 |
| JP | 2001-17041 | 1/2001 |
| JP | 5296287 | 6/2013 |
| WO | 95/16496 | 6/1995 |
| WO | 199617149 | 6/1996 |
| WO | 97/34360 | 9/1997 |
| WO | 199847215 | 10/1998 |
| WO | 200138123 | 5/2001 |
| WO | 2003055560 | 7/2003 |
| WO | 2007/106207 | 9/2007 |
| WO | 2008139127 | 11/2008 |
| WO | 2009/000015 | 12/2008 |
| WO | 2009047469 | 4/2009 |
| WO | 2009108040 | 9/2009 |
| WO | 2009127142 | 10/2009 |
| WO | 2011079266 | 6/2011 |
| WO | 2017/201512 | 11/2017 |

OTHER PUBLICATIONS

PCT International Preliminary Report on Patentability in International Application PCT/US2020/051492, mailed Mar. 31, 2022, 17 pages.
PCT International Search Report and Written Opinion in International Application PCT/US2021/022585, mailed Jul. 15, 2021, 19 pages.
PCT Invitation to Pay Fees and Partial Search Report in Application PCT/US2020/051492, mailed Jan. 20, 2021, 23 pages.
Climbing Wall Descent Controllers-Instruction Manual v3. Aug. 18, 2008, pp. 1-20.
MSA, The Safety Company, Stop Use Notice for Redpoint and Auto-Belay Descenders, dated Oct. 14, 2009, 1 page.
TruBlue Auto Belay User Manual, Model TB150-12C, pp. 1-25.
Chinese Office Action in Application 202080080391.6, mailed Jan. 18, 2023, 11 pages.
PCT International Search Report and Written Opinion in International Application PCT/US2020/051492, mailed Mar. 15, 2021, 27 pages.
PCT International Preliminary Report on Patentability in International Application PCT/US2021/022585, mailed Sep. 29, 2022, 9 pages.
EP Communication in 20797240.7, mailed Dec. 22, 2023, 5 pages.
Chinese 1st Office Action in Application in Application 202080080391.6, mailed Jan. 18, 2023, 13 pages.
Chinese 2nd Office Action in Application in Application 202080080391.6, mailed Aug. 2, 2023, 4 pages.

* cited by examiner

LOCK-OFF DESCENT CONTROL SYSTEMS AND DEVICES

CROSS-REFERENCE TO RELATED APPLICATIONS

This application claims priority to and the benefit of U.S. Provisional Application No. 63/021,423, filed May 7, 2020, and U.S. Provisional Application No. 62/903,385, filed Sep. 20, 2019, which are incorporated by reference herein in their entireties.

INTRODUCTION

Climbing (e.g., indoor or outdoor rock climbing) typically uses a two-person manual system, a climber and a belayer, attached together with a rope. The rope is attached on one end to the climber, extends to the top of a climbing route through a top anchor, and comes down to the belayer. The belayer feeds the rope through a belay device and can catch the climber when they fall. Once the climber gets to the top of the climbing route, the climber loads the rope and transfers the weight to the belayer and the belay device. The belayer can then lower the climber by feeding the rope back through the belay device. This system allows the climber to stop at any location on the climbing route, transfer their weight to the rope, and the belayer can hold the climber mid-route. This allows the climber to rest or the time to try difficult moves repeatedly without being lowered all the way down to the ground. The method is known as "lock-off" or "hangdogging."

Some known climbing systems can automatically protect a climber from falls without the use of the belayer. Line dispensing devices, such as auto-belay devices used for climbing, retract slack when the rope is not under load (e.g., when the climber is climbing) and provides a braking force when the rope is loaded (e.g., when the climber falls) so that the climber on the end of the rope is lowered to the ground. These systems allow climbers to climb alone and eliminates the need for the belayer. Auto-belay devices, however, cannot lock-off and allow the climber to rest or hangdog mid-route.

LOCK-OFF DESCENT CONTROL SYSTEMS AND DEVICES

This disclosure describes examples of automatic descent control systems and descent devices (e.g., auto-belay devices) that are operable to automatically lower a climber at a first descent rate upon loading the descent device and to selectively lower the climber at a different second descent rate upon loading the descent device. The first descent rate is greater than the second descent rate so that with the second descent rate the climber is allowed to hang above a ground surface without being lowered all the way to the ground surface as required or desired. The control systems and descent devices can be implemented in any number of descent control technologies including fan braking systems, friction braking system, hydraulic braking systems, magnetic braking systems, etc. as described herein.

In one aspect, the technology relates to an automatic descent control device including: a line configured to be attached to a load; a line system that retracts slack from the line when the line is not loaded and that extends the line when the line is loaded; and at least one braking system that provides a braking force when the line is loaded so as to control extension of the line and a descent rate of the load, wherein the at least one braking system is operable in at least two configurations: a first configuration, wherein the at least one braking system lowers the load at a first descent rate; and a second configuration, wherein the at least one braking system lowers or locks the load at a second descent rate, and wherein the load is a constant, and the first descent rate is greater than the second descent rate.

In an example, the second descent rate locks the position of the line and prevents the load from lowering. In another example, the at least one braking system automatically switches from the second configuration to the first configuration upon a predetermined time period. In yet another example, the at least one braking system includes a first braking system operable in the first configuration and a second braking system operable in the second configuration. In still another example, the second braking system engages with the line so as to define the second descent rate. In an example, the second braking system engages with the line system so as to define the second descent rate.

In another example, the at least one braking system includes one of a fan braking system, a friction braking system, a hydraulic braking system, an electromagnetic braking system, or a magnetic braking system. In yet another example, a controller is configured to switch the at least one braking system between the first configuration and the second configuration. In still another example, the controller is one of an electronic controller or a mechanical controller.

In another aspect, the technology relates to an automatic descent control device including: a housing; a shaft rotatably supported within the housing; a line configured to be attached to a load, wherein the line is coupled to the shaft, and wherein the line retracts within the housing and winds about the shaft when the line is not loaded, and extends from the housing and unwinds about the shaft when the line is loaded; an eddy current braking system coupled to the shaft, wherein the eddy current braking system provides a first braking force to the shaft when the line is loaded, and wherein the eddy current braking system lowers the load at a first descent rate; a second braking system coupled to the shaft, wherein the second braking system provides a second braking force to the shaft when the line is loaded, wherein the second braking system lowers the load at a second descent rate, and wherein the load is a constant, and the first descent rate is greater than the second descent rate; and a controller coupled to the second braking system, wherein the controller selectively engages the second braking system upon receiving an engagement signal.

In an example, the eddy current braking system includes a brake shaft rotatably coupled to the shaft, at least one conductor, and at least one magnet, and wherein the first braking force is generated by rotation of the brake shaft inducing centrifugal forces into the at least one conductor or the at least one magnet such that the at least one conductor or the at least one magnet is moved relative to the other. In another example, the brake shaft is offset from the shaft, and the brake shaft is coupled to the shaft via by one or more gears. In yet another example, the brake shaft is configured to rotate at a different speed than the shaft. In still another example, the rotor is configured to rotate at the same speed of the shaft. In an example, a sensor configured to detect when the line is loaded and send an actuation signal to the controller, and the controller selectively actuates the second braking system upon receiving the actuation signal.

In another example, the sensor includes one or more of an encoder, an accelerometer, a force gauge, a strain gauge, and a laser sensor. In yet another example, an engagement button configured to generate the engagement signal, and the engagement button is remote from the housing. In still another example, the second braking system includes one of a disk braking system, a band braking system, and an electromagnetic braking system. In an example, the second braking system includes the disk braking system, and the disk braking system includes a rotor coupled to the shaft and at least one caliper supported on the housing. In another example, the second braking system includes the electromagnetic braking system, and the electromagnetic braking system includes a rotor coupled to the shaft and an electromagnet supported on the housing.

In another aspect, the technology relates to an automatic descent control system includes: a descent device including: a line configured to be attached to a load; a line system that retracts slack from the line when the line is not loaded and that extends the line when the line is loaded; at least one braking system that provides a braking force when the line is loaded so as to control extension of the line and a descent rate of the load, wherein the at least one braking system is operable in at least a first configuration and a second configuration; and a controller configured to selectively engage the second configuration; an engagement device coupled in communication to the controller, wherein when the engagement device is disengaged, the at least one braking system operates in the first configuration and lowers the load at a first descent rate, and when the engagement device is engaged, the controller engages the second configuration of the at least one braking system and lowers the load at a second descent rate, and wherein the first descent rate is greater than the second descent rate; and a sensor device coupled in communication to the controller, wherein the sensor device detects when the line is loaded such that the controller actuates the at least one braking system in the second configuration.

In an example, the at least one braking system automatically operates in the first configuration unless the second configuration is engaged. In another example, upon engagement of the second configuration via the engagement device, the controller automatically disengages the second configuration after a predetermined time period. In yet another example, the sensor device is remote from the descent device. In still another example, the sensor device monitors a position of the load. In an example, the sensor device monitors a condition of the descent device.

In another example, the engagement device is remote from the descent device. In yet another example, the engagement device is sized and shaped as a rock climbing hold.

In another aspect, the technology relates to an automatic descent control device including: at least one braking system configured to receive at least a portion of a line that attaches to a load, wherein the at least one braking system provides a braking force when the line is loaded so as to control a rate that the line passes through the descent control device and a descent rate of the load, wherein the at least one braking system is operable in at least two configurations: a first configuration, wherein the at least one braking system lowers the load at a first descent rate; and a second configuration, wherein the at least one braking system lowers or locks the load at a second descent rate, and wherein the load is a constant, and the first descent rate is greater than the second descent rate.

In an example, the second descent rate locks the position of the line and prevent the load from lowering. In another example, the at least one braking system includes a first braking system operable in the first configuration and a second braking system operable in the second configuration. In yet another example, the first braking system includes a series of pulleys that the line extends through. In still another example, the braking force is based on a speed of the line passing through the at least one braking system.

In another aspect, the technology relates to an automatic descent control device including: a housing; a shaft rotatably supported within the housing; a line configured to be attached to a load, wherein the line is coupled to the shaft, and wherein the line retracts within the housing and winds about the shaft when the line is not loaded, and extends from the housing and unwinds about the shaft when the line is loaded; a first braking system coupled to the shaft, wherein the first braking system provides a first braking force to the shaft when the line is loaded, and wherein the first braking system lowers the load at a first descent rate; an electromechanical braking system coupled to the shaft, wherein the electromechanical braking system provides a second frictional braking force to the shaft when the line is loaded, wherein the electromechanical braking system lowers or locks the load at a second descent rate, and wherein the load is a constant, and the first descent rate is greater than the second descent rate; and a controller coupled to the electromechanical braking system, wherein the controller selectively engages the electromechanical braking system upon receiving an engagement signal.

In an example, the first braking system is an eddy current braking system. In another example, the electromechanically braking system includes: a plug shaft configured to couple to the shaft; a clutch bearing coupled to the plug shaft; a brake hub coupled to the clutch bearing, the plug shaft, the clutch bearing, and the brake hub are all co-axial and all rotatably driven by the shaft; a clamp wheel coupled to the housing; and a brake pad coupled to the clamp wheel. In yet another example, the clamp wheel includes an electric coil configured to generate a magnetic field. In still another example, the electromechanically braking system includes: a reluctor wheel; and a sensor, the sensor is configured to measure rotational speed and direction of the shaft via the reluctor wheel. In an example, a remote interface hold is coupled in communication with the descent control device, the interface hold includes a power source configured to provide power to the electromagnetic braking system.

In another aspect, the technology relates to a secondary braking system for an automatic descent control device configured to generate a first braking force relative to a rotatable shaft, the secondary braking system including: a plug shaft configured to couple to the rotatable shaft of the automatic descent control device and rotation driven therefrom; a rotor assembly coupled to the plug shaft; and a stator assembly fixed relative to the rotary assembly, wherein the rotor assembly and stator assembly are configured to generate a second braking force relative to the shaft through the plug shaft.

In an example, the second braking force is friction based. In another example, the rotor assembly includes: a clutch bearing coupled to the plug shaft; and a brake hub coupled to the clutch bearing, the plug shaft, the clutch bearing, and the brake hub are all co-axial and all rotatably driven by the rotatable shaft. In yet another example, the stator assembly includes: a clamp wheel coupled to the housing; and a brake pad coupled to the clamp wheel. In still another example, a controller is configured to selectively engage the second braking force, the controller is configured to measure rotational speed and direction of the rotatable shaft via a reluctor wheel.

These and various other features as well as advantages that characterize the auto belays described herein will be apparent from a reading of the following detailed description and a review of the associated drawings. Additional features are set forth in the description which follows, and in part will be apparent from the description, or may be learned by practice of the technology. The benefits and features of the technology will be realized and attained by the structure particularly pointed out in the written description and claims hereof as well as the appended drawings.

It is to be understood that both the foregoing introduction and the following detailed description are exemplary and explanatory and are intended to provide further explanation of the invention as claimed.

BRIEF DESCRIPTION OF THE DRAWINGS

The following drawing figures, which form a part of this application, are illustrative of described technology and are not mean to limit the scope of the invention as claimed in any manner, which scope shall be based on the claims appended hereto.

DETAILED DESCRIPTION

This disclosure describes examples of automatic descent control systems and descent devices that are operable in two different configurations. In a first and normal operational configuration, the system and devices automatically lower a climber at a first descent rate upon loading the descent device. As described herein, loading the descent device includes the climber falling or transferring at least a portion of weight to the descent device. Additionally, the system and devices are selectively operable in a second and lock-off operational configuration, whereby the climber is lowered at a second descent rate upon loading the descent device. The first descent rate is greater than the second descent rate so that in the lock-off operational configuration the climber is allowed to hang above a ground surface without being lowered all the way to the ground surface.

The descent control systems described herein includes a descent device with a braking system that is operable in both the normal operational configuration and the lock-off operational configuration. An engagement device is used to selectively engage the lock-off operational configuration of the braking system. This engagement device can be remote from the descent device, for example, a button on a climbing wall or part of a control station that operationally monitors one or more features of the climbing wall. Additionally, a sensor device is provided so that the loading of the descent device can be detected and the braking system engaged so as to generate a braking force for the second descent rate. This sensor device can monitor any number of components of the descent control system, for example movement of the descent device, the braking system itself, or a position of the climber. As such, the engagement device can be actively engaged by the climber or automatically engaged requiring no action by the climber.

The descent devices (e.g., auto belay devices) described herein can either include a single braking system that can change operational configurations or have two separate braking systems, one for each operational configuration. By using two separate braking systems, existing descent devices, such as fan braking systems, friction braking systems, hydraulic braking systems, electromagnetic braking systems, and magnetic braking systems, can be adapted to allow the climber to hang above the ground surface in the lock-off operational configuration.

Throughout this description, references to orientation (e.g., front(ward), rear(ward), top, bottom, back, right, left, upper, lower, etc.) of the descent device relate to its position when installed on a climbing wall and are used for ease of description and illustration only. No restriction is intended by use of the terms regardless of how the descent device is situated on its own.

Figure 1:
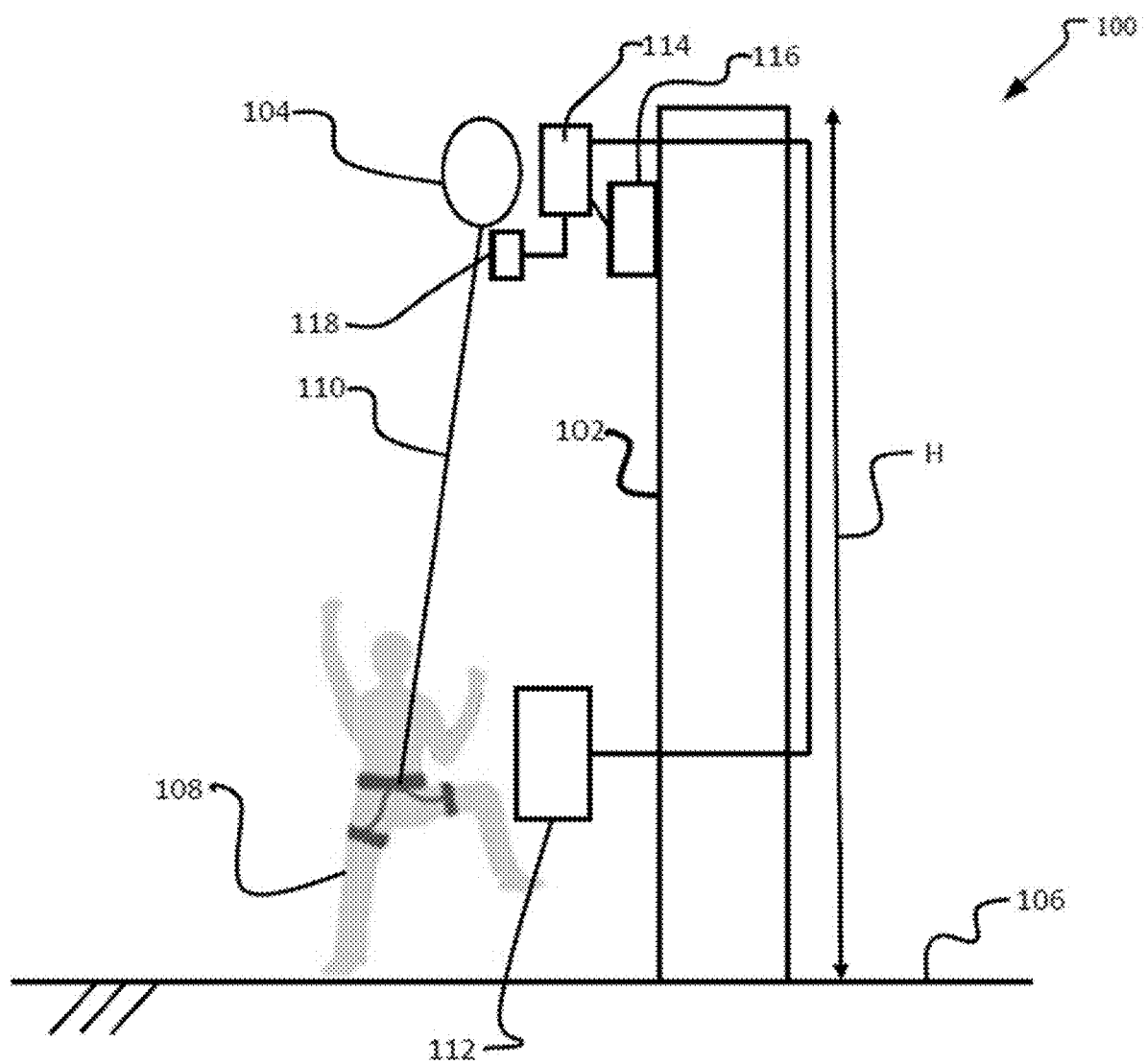
FIG. 1 is a schematic view of an exemplary automatic descent control system.

FIG. 1 is a schematic view of an exemplary automatic descent control system 100. The system 100 includes a climbing wall 102 and a descent device 104 positioned at the top of the climbing wall 102. In the example, the climbing wall 102 is an indoor wall having a height H above a ground surface 106 and a plurality of climbing holds (not shown) so that a climber 108 can climb up the wall 102 and above the ground surface 106 as desired. While the examples described herein include an indoor climbing wall 102, it should be appreciated that any of the components of the system 100 may be used in outdoor climbing walls, for example, artificial walls, natural walls, mobile walls, etc., challenge courses, for example, an obstacle course, a ropes course, etc., training or work based activities, for example, search and rescue, fire department, construction, etc., safety systems, or any other actively that requires or desires descending from a height above a ground surface.

The descent device 104 includes a line 110 configured to be attached to the climber 108 (e.g., a load). As used herein, the term "line" refers to any cable, rope, string, chain, wire, webbing, strap, or any other length of flexible material. The line 110 is enabled to retract within the descent device 104 when the line 110 is not loaded. For example, when the climber 108 is moving up the wall 102 so that the slack in the line 110 is removed. The line 110 is also enabled to extend from the descent device 104 when the line 110 is loaded. For example, when the climber 108 falls from the wall 102 and the climber's weight is transferred from the wall 102 to the line 110. The descent device 104 has a braking system (not shown) that applies a braking force to the line 110 when the line is loaded so as to control the extension of the line 110 and a descent rate of the climber 108. The descent device 104 can have a fan braking system, a friction braking system, a hydraulic braking system, an electromagnetic braking system, a magnetic braking system, or any other braking system as required or desired. Different types of descent devices 104 are described further below in FIGS. 6-15.

In other examples, the descent device 104 may be a device that the line 110 passes through and applies a braking force on the line 110 so as to control the rate that the line 110 passes through, and thus, a descent rate of the climber 108. For example, these devices can be climb assist pulleys that at low speeds (e.g., the climber climbing and the line unloaded) allows the line 110 to freely pass through the braking system and at increased speeds (e.g., the climber falling and loading the line) the braking system locks the line 110. These types of devices typically have a friction braking system such as a series of pulleys that engage with the line 110, or use a mechanical advantage with a camming mechanism.

In the example, the descent device 104 is selectively operable in at least two configurations to control the descent rate of the climber 108. For example, the descent device 104 can have a first or normal operational configuration, in which when the climber 108 falls from the wall 102, the line 110 extends so as to fully lower the climber 108 to the ground surface 106. In this normal operational configuration, the braking system cannot lock-off and hold the climber 108. Rather, the braking forces on the line 110 are automatically generated and only when the line 110 is not loaded and line extension stops do the braking forces also stop. As such, the descent device 104 also has a second or lock-off operational configuration, in which when the climber 108 falls from the wall 102, the line 110 is restricted from extending so that the climber 108 is held in position on the wall 102 and above the ground surface 106 by the descent device 104. This configuration allows the climber 108 to rest and try difficult moves repeatedly above the ground surface 106 without being required to descend all the way to the ground as typical of the normal operational configuration.

When the descent device 104 is in the normal operational configuration, the climber 108 is lowered at a first or normal descent rate. For example, a normal descent rate can be between about 0.5 meters/second and 4 meters/second. This type of descent rate typically results in the climber 108 being lowered all the way to the ground surface 106 after falling from the wall. However, when the descent device 104 is in the lock-off operational condition, the climber 108 is lowered at a second or lock-off descent rate. For example, a lock-off descent rate can be between about 0 meters/second and 0.3 meters/second. In some example, the lock-off descent rate may physically stop the climber 108 and prevent descent down the wall 102 (e.g., 0 meters/seconds). In other examples, the lock-off rate may significantly slow down the climber's descent down the wall 102 compared to the normal descent rate and allow for the climber 108 to rest and climb back on the wall 102. In either example, the normal descent rate is greater than the lock-off descent rate for the same climber load.

The descent device 104 can switch between the normal operational configuration and the lock-off operational configuration as required or desired. For example, the switch between the different configurations can be actively induced by the climber 108 or automatically within the device 104 (e.g., passive from the climber 108). As illustrated in FIG. 1, an engagement device 112 is disposed remote from and coupled in communication with a controller 114 of the descent device 104. The controller 114 is configured to switch the descent device 104 between the normal operational configuration and the lock-off operational configuration. In the example, when the engagement device 112 is engaged, the descent device 104 operates in the lock-off operational configuration. Otherwise the engagement device 112 is disengaged so that the descent device 104 operates in the normal operational configuration as a default configuration. The engagement device 112 may be a button located on the bottom of the wall 102 so that the climber can elect to engage the lock-off operational configuration when climbing alone.

Additionally, when the climber 108 is locked-off, the lock-off operational configuration is disengageable (e.g., actively or passively) so that the climber 108 can be lowered all the way to the ground surface 106 and not remained locked-off on the wall. Passive disengagement (e.g., from the climbers 108 perspective) can be controlled by the controller 114 (e.g., either a mechanical or electronic controller). In one example, the climber 108 falling from the wall 102 can start a mechanical clock (not shown) that includes springs and gears, which after a predetermined time period would trigger disengagement of the lock-off operational configuration. In another example, the mechanical clock could be an hourglass or a water clock (e.g., movement of fluid, gas, or solid through a constriction) that is configured to a predetermined time period. In yet another example, the timer can be a mechanical device such as a cam lobe, spring, or a gas shock. In still another example, the descent device 104 may have an electronic timer (e.g., on the controller 114) that automatically disengages the lock-off operational configuration upon a predetermined time period or condition that is satisfied so that the climber 108 can lower all the way to the ground surface 106. For example, if the climber 108 hangs from the line 110 for more than 30 seconds, the descent device 104 may automatically switch to the normal operational configuration and lower the climber 108 towards the ground surface 106. In another example, upon three sequential lock-off operations by the climber 108, the subsequent lock-off operation will automatically switch the descent device 104 to the normal operational configuration and lower the climber 108 towards the ground surface 106. As such, with this layout of the system 100, the climber 108 may climb without another person (e.g., a belayer) present.

In some examples, the engagement device 112 may be sized and shaped as a rock climbing hold for use by the climber 108. In other examples, the engagement device 112 can be a switch, an adjustable controller, a computer interface, a touch sensitive area, a biometric sensor, a mobile application, a sound sensor, etc. For example, a position sensor disposed on the wall 102 and above the ground surface 106 (e.g., around six feet) may be used to detect a position of the climber 108 on the wall 102 and automatically engage the lock-off operational configuration once the climber 108 reaches a predetermined height. In still another example, the engagement device 112 can be a scanner that reads information off of a RFID tag, bar code, QR code, or other code based information and relay the information to the descent device 104. For example, the code may engage the lock-off operational configuration and specify the time period for lock-off or specify three sequential lock-off operations by the climber 108 so that after the condition is satisfied the descent device 104 switches to the normal operational configuration. In yet another example, the engagement device 112 may be positioned within the descent device 104 and include a sensor that can detect a specific series of patterns from the climber 108 pulling on the line 110. For example, when the climber 108 pulls down on the line 110 three times in quick succession, the engagement device 112 may engage the lock-off operational configuration. Additionally or alternatively, the engagement device 112 can be other system/method that allows the climber 108 to selectively engage the lock-off operational configuration as required or desired. In an example, the engagement device 112 may be a remote switch that the climber 108 can carry during use.

The automatic descent control system 100 may also include one or more secondary engagement devices 116 coupled in communication with the controller 114. For example, a button may be disposed at the top of the wall 102 so that when the climber 108 completes the route, the lock-off operational configuration can actively be disengaged and the climber 108 can be lowered all the way to the ground surface 106. In another example, the lock-off operation configuration may be the default configuration and the engagement device 112 switches the descent device 104 to the normal operational configuration. For example, the engagement device 112 is disposed at the top of the wall 102 so as to enable the climber 108 to engage the normal operational configuration of the descent device 104 and lower all the way to the ground surface 106.

The descent device 104 has a braking system (not shown) that controls the descent rate of the climber 108 in both operational configurations. In some examples, the same braking system may be used in both operational configurations, while in other examples, each operational configuration may have its own independent braking system. Braking systems are described further below in reference to FIGS. 6-13. In some examples, to actuate one or more of the braking systems of the descent device 104, a sensor device 118 that is coupled in communication to the controller 114 is utilized. The sensor device 118 detects one or more operational configurations of the line 110 being loaded (e.g., the climber 108 falling off the wall) so as to actuate the braking system.

In the example, the sensor device 118 is disposed within the descent device 104 so that a condition of the descent device 104 is monitored. The sensor device 118 can be a rotatory encoder to measure whether the line 110 is extending or retracting from the housing and at what velocity and/or acceleration. In another example, an accelerometer, force sensor, strain gauge, velocity sensor, laser sensor, LIDAR sensor, sonar, camera, etc. can be used as required or desired. In other examples, the sensor device 118 can be remote from the descent device 104. For example, one or more sensor devices 118 can be placed on the wall 102 and/or the ground surface 106 and be used to monitor the position and movement of the climber 108 so if a fall occurs, the braking system can be actuated. In still another example, the sensor device 118 can be a camera pointed at the entire wall system to monitor the position and movement of the climber 108 and actuate the braking system as required or desired. The sensor device 118 can be placed on/in the line 110, the hold features on the wall 102, along the route of the climber 108, or on the wall 102 itself. In yet another example, the sensor device 118 may be a button located on the wall 102 or remote from the wall 102 that a belayer presses to actuate the braking system as required or desired.

The controller 114 can be connected to the engagement device(s) 112, 116 and/or the sensor device(s) 118 in a wired communication network. In other examples, the controller 114 is connected to the engagement device(s) 112, 116 and/or the sensor device(s) 118 in a wireless communication network. Wireless communication can include infrared, BLUETOOTH® wireless technology, 802.11a/b/g/n, cellular, or other radio frequency communication systems as required or desired. The controller 114 operates to receive data from the engagement device(s) 112, 116 and the sensor device(s) 118 about user inputs or selections for controlling the descent device 104 (e.g., engaging a specific configuration and actuating the brake). In some examples, the controller 114 can also operate to transmit data regarding the descent device 104 as required or desired. In these examples, the controller 114 is an electronic controller that electronically engages and actuates the braking system. For example, by electrically actuating a servo, a motor, etc. so as to engage the lock-off operational configuration and actuate the braking system to generate a braking force.

In other examples, the controller 114 can be a mechanical controller that mechanically engages and actuates the braking system. For example, by mechanically actuating a power screw, lead screw, worm gear, rack and pinion, ratchet, pawls, spring clutch, flyball governor, inertial governor, counterweight, resistance, spring(s), clock spring, diaphragm, Belleville washer, torsion bar, leaf spring, coil spring, gas shock, etc. so as to engage the lock-off operational configuration and actuate the braking system to generate a braking force.

Figure 2:
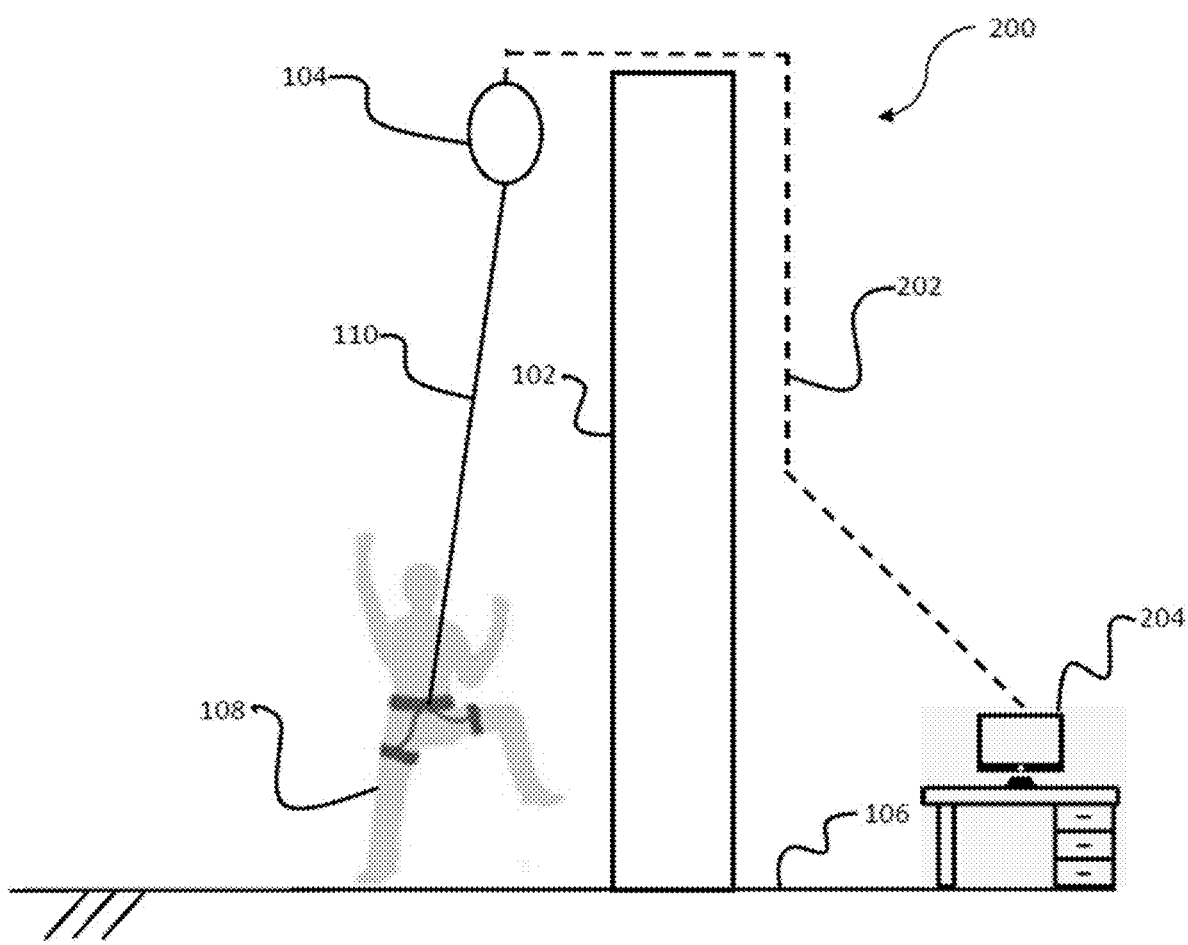
FIG. 2 is a schematic view of another automatic descent control system.

FIG. 2 is a schematic view of another automatic descent control system 200. Similar to the example described above, the system 200 includes a climbing wall 102 and a descent device 104 having a line 110 attached to a climber 108. In this example, however, the descent device 104 is coupled in communication 202 (e.g., wired or wireless) to a control station 204. The control station 204 is remote from the wall 102 and, in some examples, can be a computing device used to implement aspects of the systems and methods described herein. The control station 204 enables a user (e.g., the belayer) to transmit control signals to the descent device 104. For example, the user can engage or disengage the lock-off operational configuration (described above) as required or desired. The control station 204 can be coupled in communication to a plurality of descent devices 104 (e.g., on a synthetic climbing wall) so that a single user can controller multiple descent devices 104 for multiple climbers 108. In other examples, the control station 204 can be coupled to remotely located sensor devices 118 (shown in FIG. 1) that monitor the climber 108. As such, the control station 204 can also transmit actuation signals to the braking system. For example, a multi-camera projection system can monitor the climbing wall 102 and be used to detect the position of the climbers 108 for actuation of the braking system.

When the control station 204 is a computing device, the computing devices includes processing device(s) and system memory. Examples of computing devices includes a desktop computer, a laptop computer, a tablet computer, a mobile device including a smart phone, or any other devices configured to process digital instructions. The computing device can include input devices, such as a keyboard, a pointer, microphone, a touch sensitive display, etc., to enable a user to provide inputs to the computing device.

Figure 3:
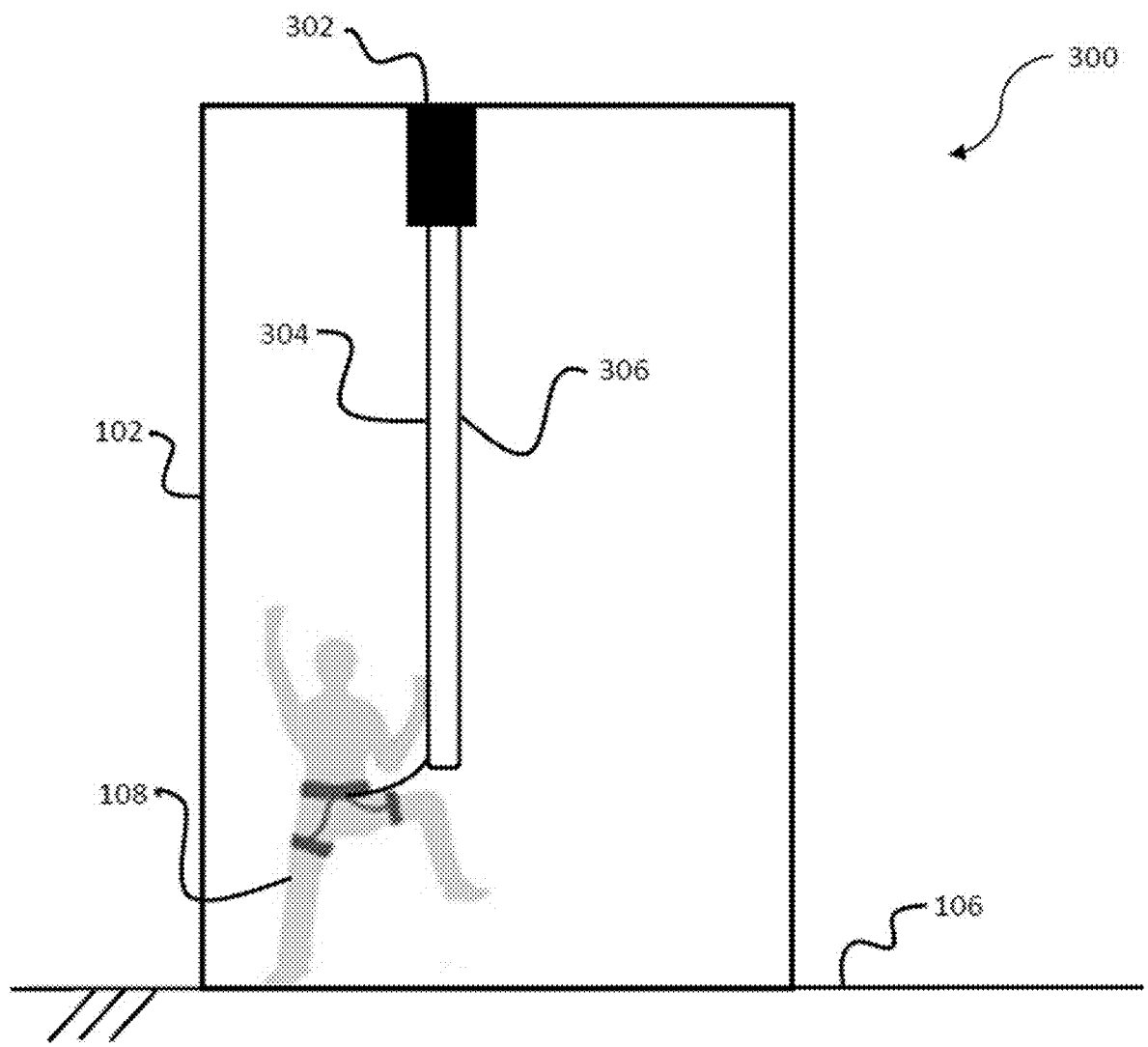
FIG. 3 is a schematic view of another automatic descent control system.

FIG. 3 is a schematic view of another automatic descent control system 300. In this example, a descent device 302 includes a first line 304 and a second line 306 in parallel. Both lines 304, 306 are attached to the climber 108 and used for when the climber 108 climbs the wall 102. The first line 304 operates only in the normal operational configuration, while the second line 306 operates only in the lock-off operational configuration. This allows for two separate braking systems to be used (e.g., one for each line 304, 306) and for the lock-off operational configuration to be engaged/disengaged as required or desired. By separating the braking systems, a redundant system is formed.

Figure 4:
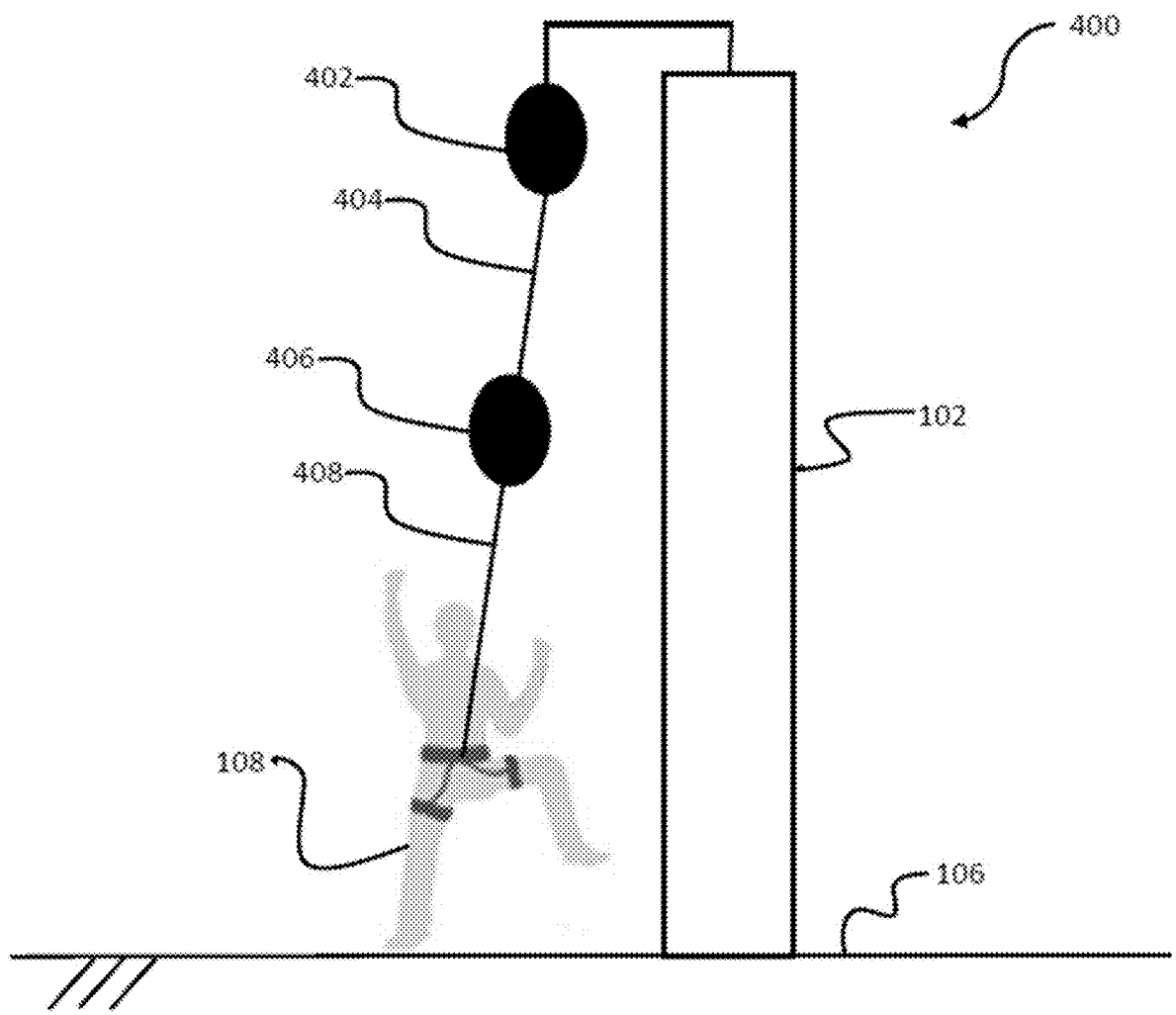
FIG. 4 is a schematic view of another automatic descent control system.

FIG. 4 is a schematic view of another automatic descent control system 400. In this example, a first descent device 402 has a first line 404 that is coupled to a second descent device 406. The second descent device 406 has a second line 408 that is coupled to the climber 108. The two descent devices 402, 406 are coupled in series and have different braking characteristics (e.g., different descent rates) so that staged braking is provided when the climber 108 falls from the wall 102 and a lock-off operational configuration is enabled. In another example, the first descent device 402 can be replaced by an actuator (e.g., electric motor, solenoid, screw jack, etc.) that extends and retracts the line 404, and thus the second descent device 406, to the ground surface. This configuration enables the second descent device 406 to have the lock-off operational configuration in any loading scenario. For the climber 108 to return to the ground surface, the actuator is used to lower the climber to the ground.

Figure 5:
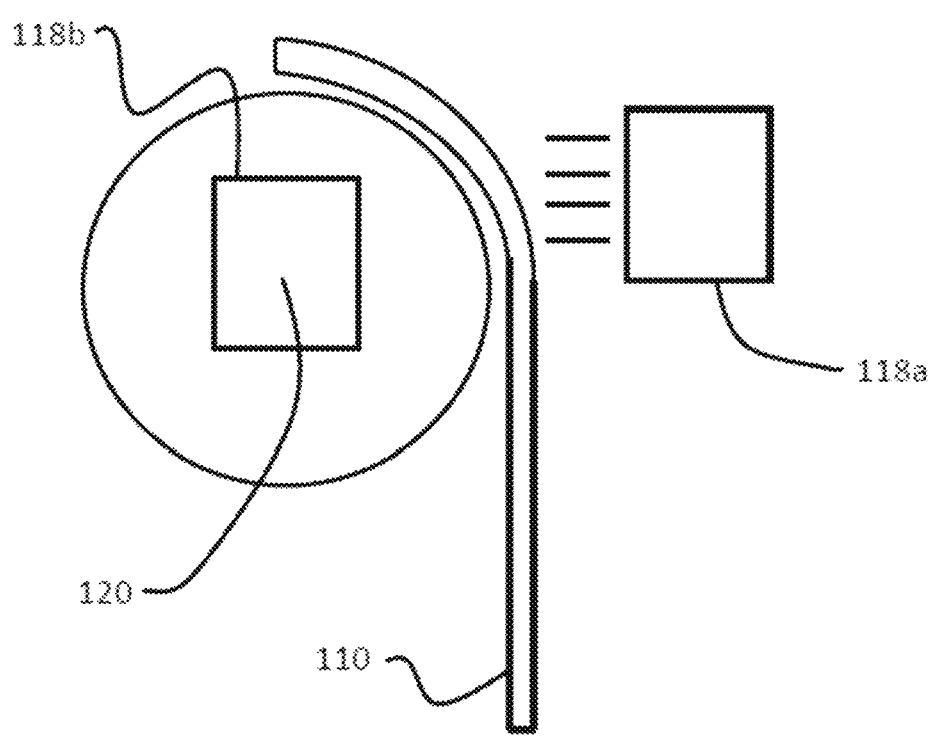
FIG. 5 is a schematic view of an exemplary sensor device for use with the automatic descent control system.

FIG. 5 is a schematic view of the sensor device 118 for use with the automatic descent control system 100 (shown in FIG. 1). With reference to FIGS. 1 and 5, the sensor device 118a can be disposed within the descent device 104 and is configured to detect one or more operational configurations of the line 110 being loaded (e.g., the climber falling off the wall) so as to actuate the braking system. In one example, the sensor device 118a can monitor the movement of the line 110. The movement can be a position and/or direction of the movement so that velocity and acceleration can be determined. For example, with a laser sensor, an accelerometer, force gauge, strain gauge, velocity sensor, LIDAR sensor, sonar, optical sensor, etc. In another example, the line may include features (e.g., metal strands, flags, RFID chips, etc.) to assist with the sensor monitoring.

In other examples, the sensor device 118b may be positioned on a rotor 120 and configured to detect one or more operational configuration of the rotor 120 being loaded so as to actuate the braking system. In one example, the sensor device 118b can monitor rotational movement of one or more components of the descent device 104. The movement can be a position and/or direction of the movement so that velocity and acceleration can be determined, for example, with a rotary encoder. The rotor 120 can be a roller that the line 110 passes over as illustrated. In other examples, the rotor 120 can be the drum that the line 110 winds about. Additionally or alternatively, the sensor device 118 can monitor components of the braking system.

The sensor device 118 can also be disposed remote from the descent device 104. For example, one or more sensor devices 118 can be placed on the wall 102 (e.g., as holds on the climbing route) and/or the ground surface 106 and be used to monitor the position and movement of the climber 108. In still another example, the sensor device 118 can be a camera pointed at the entire wall system to monitor the position and movement of the climber 108 (e.g., via the control station 204 (shown in FIG. 2)). In yet another example, the sensor device 118 may be a button located on the wall 102 or remote from the wall 102 that a belayer presses to actuate the braking system as required or desired. In the examples described, the normal operational configuration typically automatically generates a braking force, but the lock-off operational configuration needs to be able to selectively engage and disengage, and thus, requires the sensor device 118 to trigger a braking force to be generated. It should be appreciated that this sequence of operation can also be reversed or that both operational configurations use the sensor device 118 to trigger a braking force to be generated.

Figure 6:
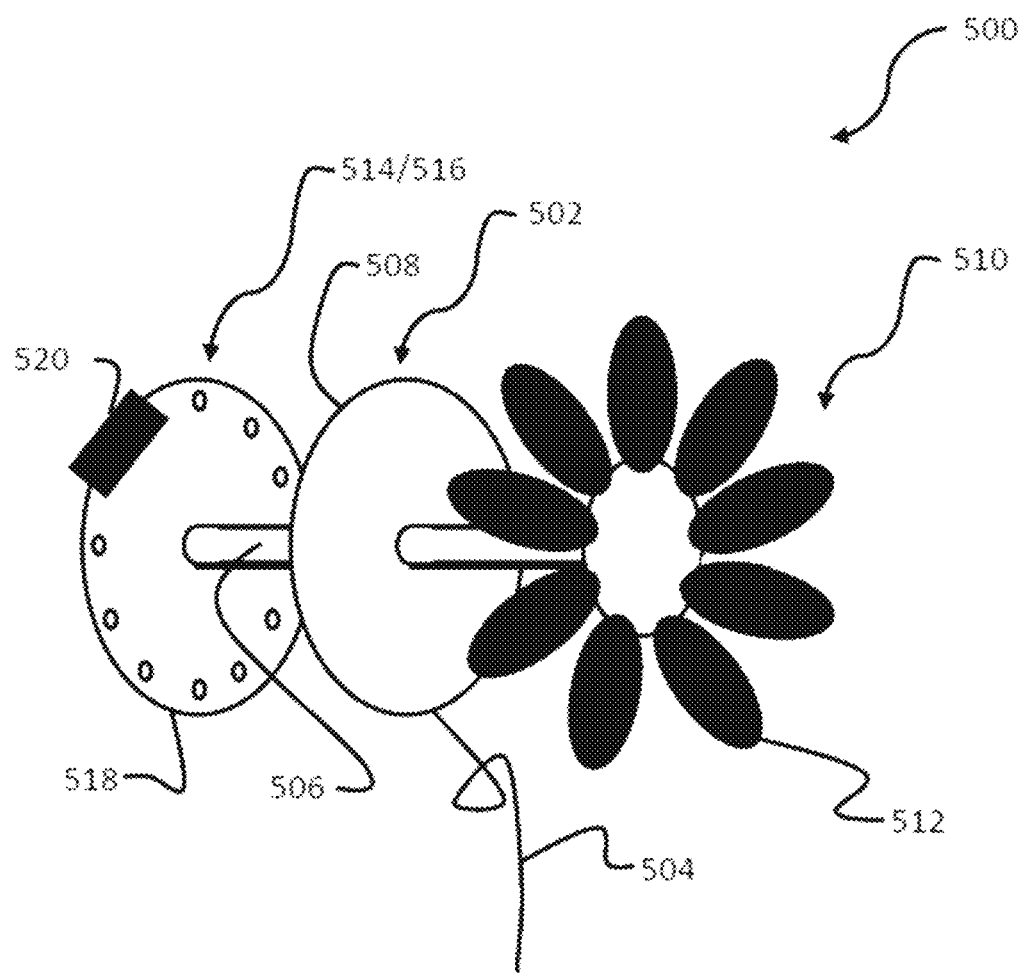
FIG. 6 is a schematic view of an exemplary automatic descent control device for use the automatic descent control system.

FIG. 6 is a schematic view of an exemplary automatic descent control device 500 for use with the automatic descent control systems described above. The descent device 500 includes a line system 502 that retracts slack from a line 504 when the line is not loaded and that extends the line 504 when the line is loaded (e.g., upon a fall from a climber). The line system 502 includes a rotatable shaft 506 and a drum 508 that the line 504 wraps around. The descent device 500 also includes a first braking system 510 that provides a braking force when the line 504 is loaded so as to control extension of the line 504 and defines a first descent rate of a load (e.g., the climber). In this example, the first braking system 510 is an automatic fan braking system and includes a plurality of fan blades 512. When the fan blades 512 rotate through a working fluid (e.g., air), a braking force is generated to slow the rotation of the shaft 506, and thus, the extension of the line 504.

Additionally, a second braking system 514 is coupled to one or more components of the first braking system 510 (e.g., the shaft 506) and also provides a braking force to the shaft 506 so as to control extension of the line 504 and define a second descent rate of the load. In the example, the second braking system 514 is a disk braking system 516 with a rotor 518 coupled to the shaft 506 and at least one caliper 520 configured to engage with the rotor 518 to generate the braking force. In operation, the first braking system 510 enables the descent device 500 to operate in the normal operational configuration. Because the fan blades 512 are coupled to the shaft 506, the first braking system 510 is always operational when the shaft 506 rotates. However, to lower the load at a second descent rate and lock-off the climber, the second braking system 514 is selectively operable so that the descent device 500 can operate in the lock-off operational configuration. Thus, the descent device 500 has at least two different configurations for two different descent rates of the same constant load (e.g., the climber).

As described above, when the second braking system 514 is enabled, the disk braking system 516 can lock the position of the shaft 506, and thus the line 504, so as to prevent the climber from lowering to the ground. Additionally, the disk braking system 516 can slowly lower the line 504 as required or desired. When the disk braking system 516 is disengaged (e.g., upon a predetermined time period described above), the descent device 500 automatically switches to the first braking system 510 so that the normal operational configuration is engaged. Furthermore, by using two separate braking systems, redundant braking systems are provided and the number of possible fail points of the descent device 500 are reduced.

In other examples, the second braking system 514 could be any other rotational brake device as required or desired. For example, a band brake wrapped around any rotating component (e.g., the shaft 506) can be used. A drum brake engaged with the drum 508 or the shaft 506 could be used. A pin lock can also be used, with a rotating element coupled to the shaft 506 having pre-loaded pins that selectively engage (e.g., by a timing device) with a static element to prevent rotation of the system. The braking system 514 could interact with the fan blades 512 to prevent rotation of the shaft 506. For example, by a band brake or by a disk brake with the tips of the blades being coupled together with a rotor element. In another example, the second braking system 514 may be an electromagnetic brake. The second braking system 514 could also be another fan type braking system. The controller 114 (shown in FIG. 1) of the descent device 500 is used to engage and disengage the second braking system 514 as described above.

In another example, the second braking system 514 can be integrated with the first braking system 510, while still enabling the descent device 500 to switch between the normal operational configuration and the lock-off operational configuration. For example, the fan blades 512 can be mounted on actuators (not shown) so that a fan feather angle relative to the axis of rotation of the shaft 506 can be selectively adjusted. In this example, the fan feather angle can be modified, for example, the blade oriented in a direction towards being substantially parallel to the axis of rotation, for a slow descent rate and the lock-off operational configuration. When the fan feather angle is adjusted with the blade oriented in a direction towards being substantially perpendicular to the axis of rotation and for a faster descent rate and the normal operational configuration.

In other examples, the size (e.g., the surface area) of the fan blades 512 may be adjustable so as to control the quantity of air acting as a working fluid for the braking system. In this example, larger surface areas of the blades would increase the braking force and decrease the descent rate of the descent device 500, while smaller surface areas of the blades decrease the braking force and increase the descent rate of the descent device 500. In yet other examples, the fan blades 512 can be coupled to a lead screw so that the blades 512 can selectively linearly move. As such, when the lead screw is engaged the fan blades 512 could travel into a friction brake, an area with one or more locking pawls, an area with a high gear ratio, etc.

In yet another example, the second braking system 514 could be integrated with the drum 508. During the extension of the line 504, the line 504 induces a tension force on the drum 508. The tension force applied on the drum 508 can be used to generate a braking force on the shaft 506 via one or more braking elements. In other examples, the second braking system 514 can be a friction brake device or a magnetic/electromagnetic brake device coupled to the shaft 506

In still other examples, the fan blades 512 may be enclosed within a housing (not shown) so that the material properties of the working fluid can be adjustable so as to change the braking force generated. For example, when the working fluid is air, the density or pressure of the air can be adjustable. In other examples, working fluids such as water, oil, gas, etc. can be used as required or desired. In another example, the working fluid could include magnetic particles so that when a magnetic field is induced, the rotation of the fan blades 512 can be locked. In yet another example, a non-Newtonian fluid can be used.

Figure 7:
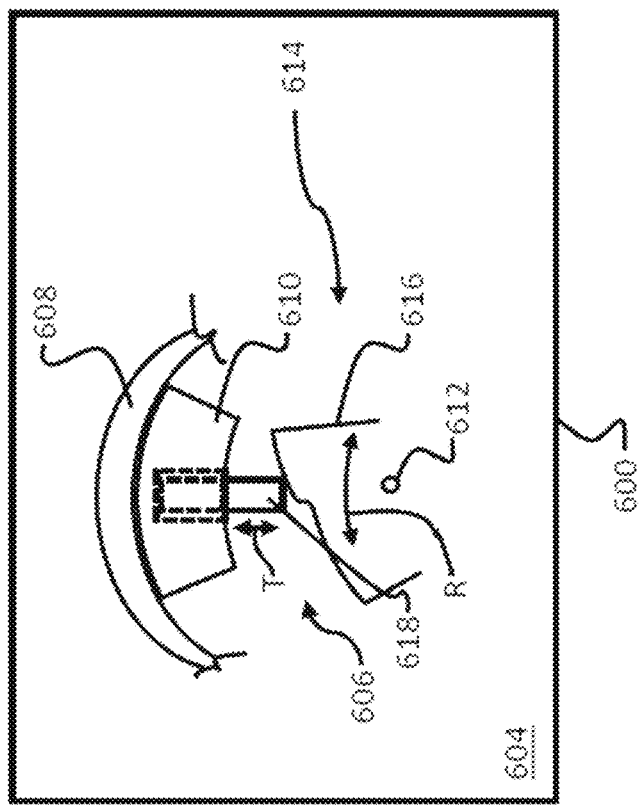
FIG. 7 is a schematic view of another automatic descent control device.
Figure 7:
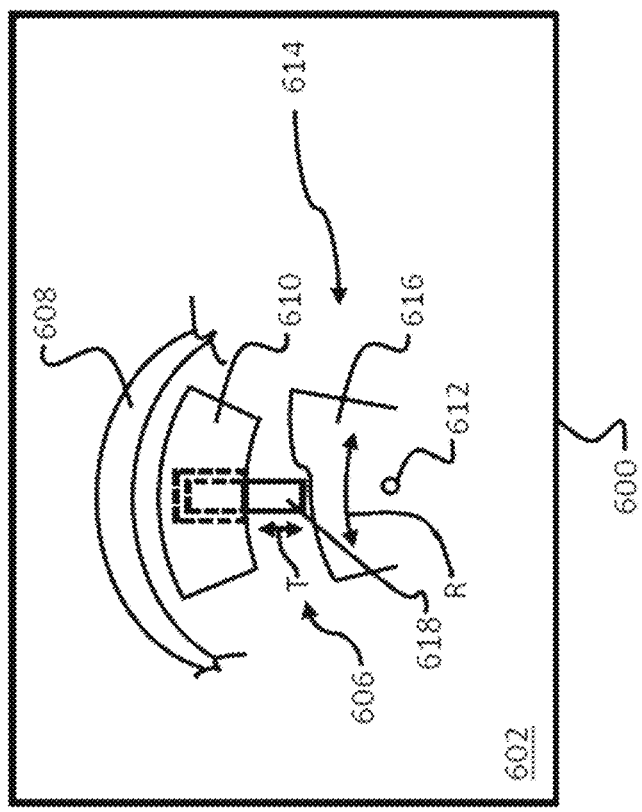

FIG. 7 is a schematic view of another automatic descent control device 600 for use with the automatic descent control systems described above. The descent device 600 is illustrated in a normal operational configuration 602 and a lock-off operational configuration 604. In this example, a braking system 606 is a frictional braking system and includes a brake drum 608 and at least one brake pad 610 that frictionally engage so as to generate a braking force. In the example, the brake pad 610 is coupled to a rotatable shaft 612 that rotates upon extension/retraction of a line (not shown). When the descent device 600 is in the normal operational configuration 602, the rotation of the brake pad 610 in relation to the drum 608 generates fiction as the braking force acting on the shaft 612 so as to lower the climber at a first descent rate.

In this example, the braking system 606 also includes an actuator system 614 that selectively prevents the brake pad 610 from rotating within the drum 608 (e.g., via a locking engagement with the drum 608) so that the descent device 600 is in the lock-off operational configuration 604 and holds the climber at a second descent rate. The actuator system 614 includes a cam 616 and a pin 618. The cam 616 can selectively rotate R so as to translate T the pin 618 by different radial cam surfaces and lock the position of the brake pad 610 against the drum 608. The cam 616 can be rotated by an electronic motor, by centrifugal force, or any other method as required or desired. In other examples, the pin 618 may be translated T by a solenoid or the like. The controller 114 (shown in FIG. 1) of the descent device 600 is used to engage and disengage the actuator system 614 as described above.

As illustrated in FIG. 7, the actuator system 614 is integrated within the braking system 606 of the descent device 600. In other examples, the braking system 606 may include two discrete braking systems. For example, a primary friction braking system is used for the normal operational configuration 602 and a secondary friction braking system for use in the lock-off operational configuration 604. In some examples, the secondary braking system can be a drum brake, a band brake, a damper, a disk brake, electromagnetic, etc. as required or desired. The primary braking system and the secondary braking system can be positioned in series or in parallel.

Figure 8:
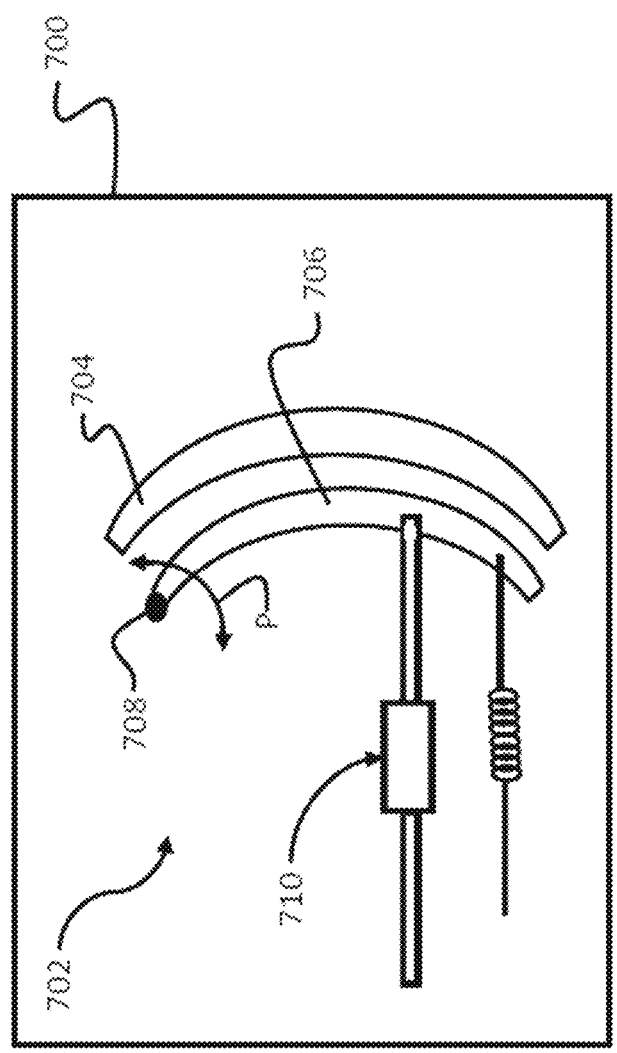
FIG. 8 is a schematic view of another automatic descent control device.

FIG. 8 is a schematic view of another automatic descent control device 700 for use with the automatic descent control systems described above. Similar to the example described above in FIG. 7, the descent device 700 includes a frictional braking system 702 with a brake drum 704 and at least one brake pad 706. In this example, however, the brake pad 706 is supported at a pivot point 708 and opposite of the pivot point 708 is an actuator system 710. The actuator system 710 selectively pivots P the brake pad 706 relative to the drum 704 and to switch between the normal operational configuration and the lock-off operational configuration as described herein. The actuator system 710 can be a solenoid, a cam, a spring, etc.

Figure 9:
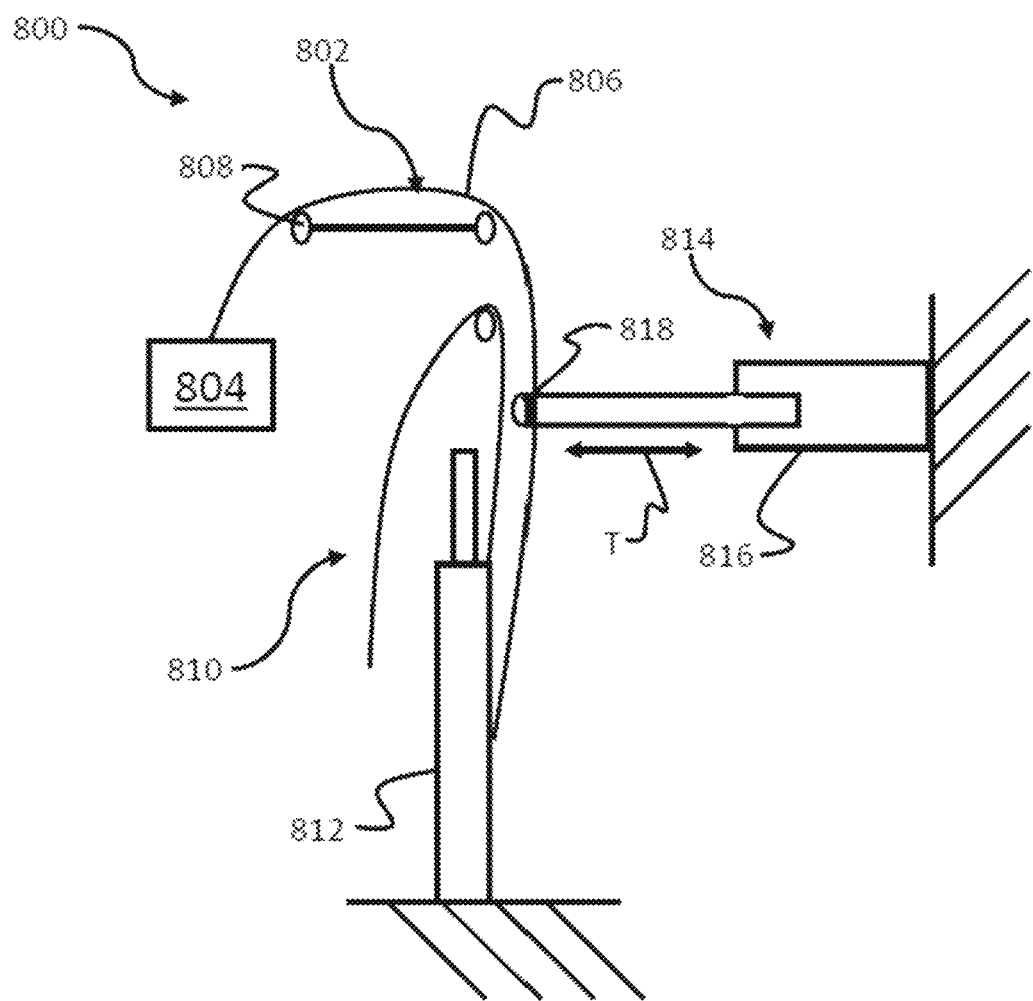
FIG. 9 is a schematic view of another automatic descent control device.

FIG. 9 is a schematic view of another automatic descent control device 800 for use with the automatic descent control systems described above. The descent device 800 includes a line system 802 that supports a load 804 (e.g., a climber). The line system 802 includes a line 806 that extends through a plurality of pulleys 808 and attaches to a first braking system 810. In this example, the first braking system 810 is a hydraulic braking system and includes a hydraulic cylinder 812. The movement of the cylinder 812 via hydraulic fluid lowers the load 804 at a first descent rate in a normal operational configuration. In one example, hydraulic fluid enters into the cylinder 812 as the climber climbs the wall and is expelled from the cylinder 812 upon descent of the climber so as to generate a braking force on the line 806 and lower the load 804 at a first descent rate.

In this example, the descent device 800 also includes a second braking system 814. The second braking system 814 is coupled to one or more components of the first braking system 810 (e.g., the line 806) and also provides a braking force so as to control extension of the line 806 and define a second descent rate of the load 804. In the example, the second braking system 814 is a linear actuator 816 that is coupled to the line 806 and configured to selectively take up slack in the line 806 so as to lower the load 804 at a second descent rate in a lock-off operational configuration. For example, the free end of the actuator 816 can include one or more rollers 818 that can engage with the line 806 and can linearly translate T. By selectively adjusting the length of the line 806 through the pulleys 808, a braking force is generated on the line 806 and lowers the load 804 at a second descent rate. The linear actuator 816 can be oriented substantially orthogonal to the cylinder 812. In some examples, the actuator 816 can be a hydraulic cylinder so that the first and the second braking systems 810, 814 can share a hydraulic fluid manifold. In other examples, the second braking system 814 can include an electric motor that actuates a solenoid to generate the translational movement T. The controller 114 (shown in FIG. 1) of the descent device 800 is used to engage and disengage the second braking system 814 as described above.

Figure 10:
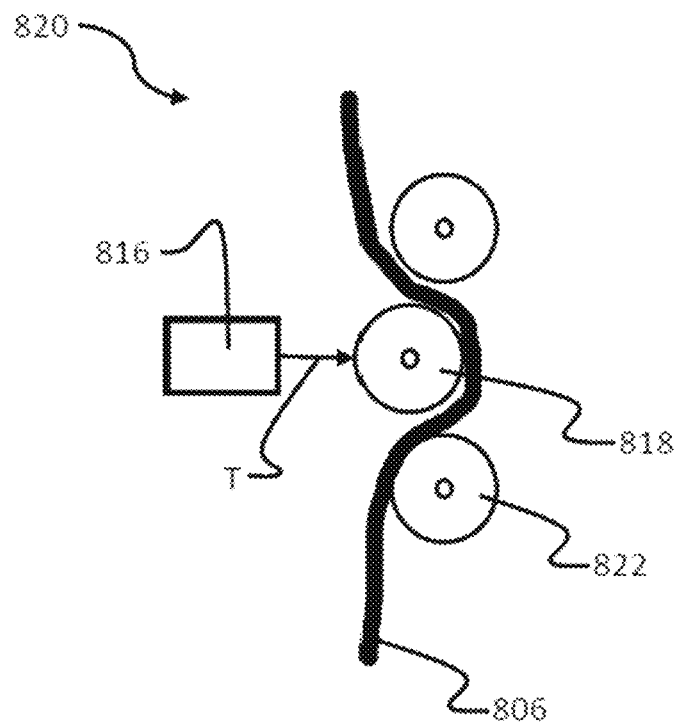
FIG. 10 is a schematic view of a second braking device that can be used with the descent device shown in FIG. 9.

FIG. 10 is a schematic view of another example of a second braking system 820 that can be used with the descent device 800 (shown in FIG. 9). In this example, the second braking system 820 can move relative to the line 806 so as to increase the friction in the line system and generate a braking force. For example, by adjusting the fleet angle of the line 806 through one or more friction elements 822. As such, the second braking system 820 can lower the load on the line 806 at a second descent rate in a lock-off operational configuration. In another example, the second braking system 820 can be a device that uses a mechanical camming mechanism (not shown) that applies mechanical friction to the line 806 to regulate the applied braking force. The controller 114 (shown in FIG. 1) of the descent device 800 is used to engage and disengage the second braking system 820 as described above.

With continued reference to FIGS. 9 and 10, in other examples, the second braking system 814, 820 could be a cable catch (not shown) that selectively engages with the line 806 in a lock-off operational configuration. The cable catch can be fixed relative to the line 806 and prevents rapid extraction of the line 806 through the system when the line is loaded (e.g., upon a fall of the climber). In another example, the second braking system 814, 820 could be a linear magnetic eddy current brake that applies a braking force on the line 806. The line 806 can include either the conductor or the magnetic element as required or desired. The braking force applied by the eddy current brake can be scaled so as to define the second descent rate. In still other examples, the second braking system 814, 820 can be coupled to one or more of the pulleys 808 so that the braking force can be applied through a rotational resistance on the pulley 808. In this example, the second braking system 814, 820 can be magnetic based, electromagnetic based, friction based, fan based, etc. as required or desired. The second braking system 814, 820 can also couple to the rotational shafts of the pulleys 808.

The second braking system 814, 820 described in FIGS. 9 and 10, acts on the line 806 of the descent device 800. It should be appreciated that a braking system acting on a line of any of the descent devices (e.g., a fan braking system, a friction braking system, a hydraulic braking system, an electromagnetic braking system, and a magnetic braking system) can be used as required or desired. In other examples, the second braking system 814, 820 could be used with a first braking system that includes a counterweight, or a motor.

Additionally or alternatively, the second braking system 814, 820 can be coupled to the hydraulic cylinder 812 so as to control the second descent rate in a lock-off operational configuration. In some examples, a secondary operator (not shown) could control (e.g., open/close) a hydraulic fluid valve so as to control the flow of hydraulic fluid though the cylinder 812. This operator can be coupled to a pressure sensor that monitors the pressure of the fluid within the hydraulic cylinder 812 to determine the position of the valve and the force of the hydraulic damper. The sensors and valve operator can be operably coupled to the control station 204 (shown in FIG. 2) as required or desired. In another example, the second braking system 814, 820 can be a magnetic based braking system coupled to the cylinder 812 (e.g., a linear eddy current brake system) to slow the extension of the rod within the cylinder and generate the braking force.

Figure 11:
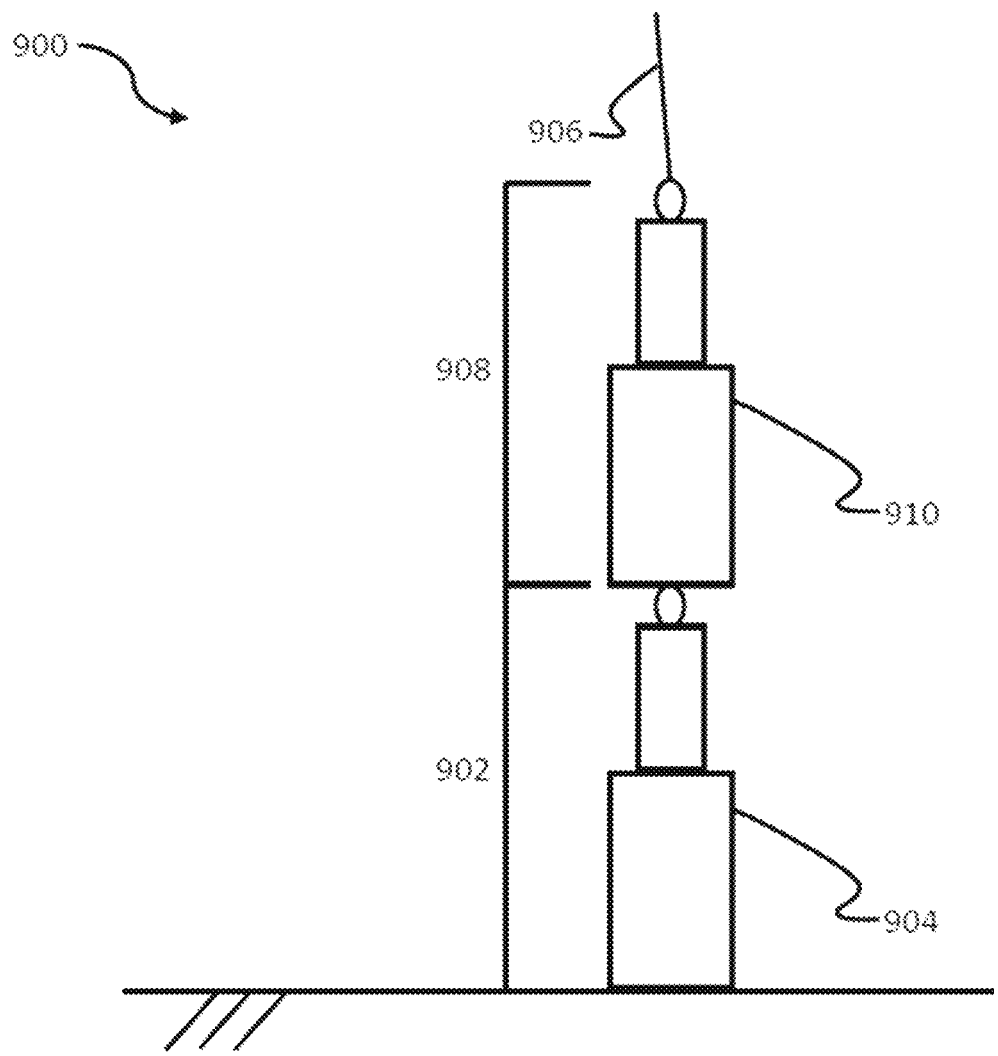
FIG. 11 is a schematic view of another automatic descent control device.

FIG. 11 is a schematic view of another automatic descent control device 900 for use with the automatic descent control systems described above. Similar to the device described in FIG. 9, in this example, the descent device 900 includes a first braking system 902 that is a hydraulic braking system with a first hydraulic cylinder 904. The movement of the cylinder 904 via hydraulic fluid lowers the climber via a line 906 at a first descent rate in a normal operational configuration. Additionally, the descent device 900 includes a second braking system 908 that is a hydraulic braking system with a second hydraulic cylinder 910 in series with the first braking system 902. The movement of the cylinder 910 via hydraulic fluid lowers the climber via the line 906 at a second descent rate in a lock-off operational configuration. In this example, the climber is attached to both braking systems 902, 908 simultaneously.

Each hydraulic cylinder 904, 910 can have different braking properties so as to define the normal operational configuration and the lock-off operational configuration. In some examples, each hydraulic cylinder 904, 910 selectively operates, while in other examples, both may operate together. The braking properties can further be adjusted by varying the length of the line 906 as described above. The second hydraulic cylinder 910 can also be activated in case the first hydraulic cylinder 904 becomes exhausted. In other examples, the first braking system 902 and the second braking system 908 may be positioned in parallel, each having a line 906 coupled to the climber and having different braking properties.

Figure 12:
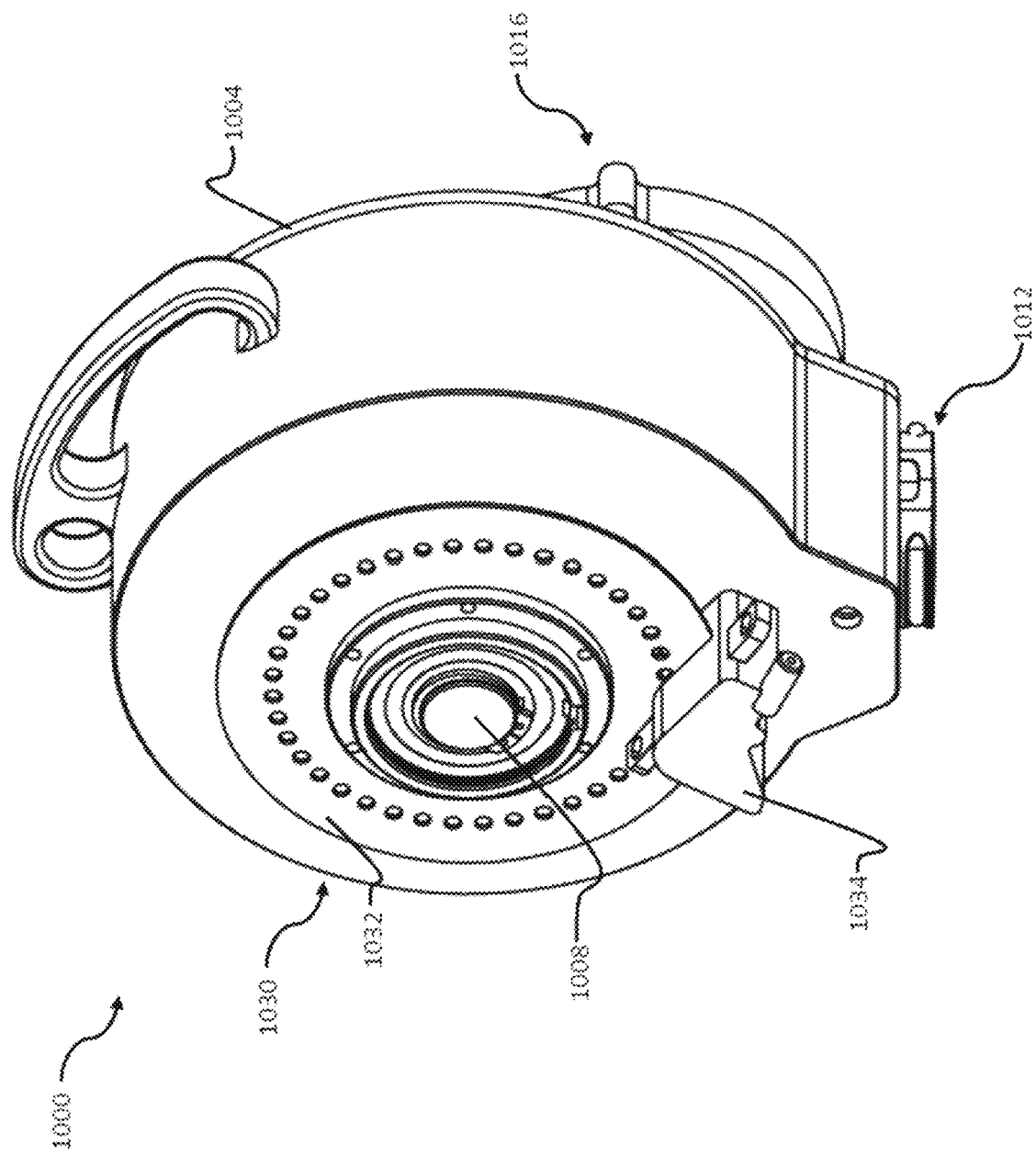
FIG. 12 is a perspective view of another automatic descent control device.
Figure 13:
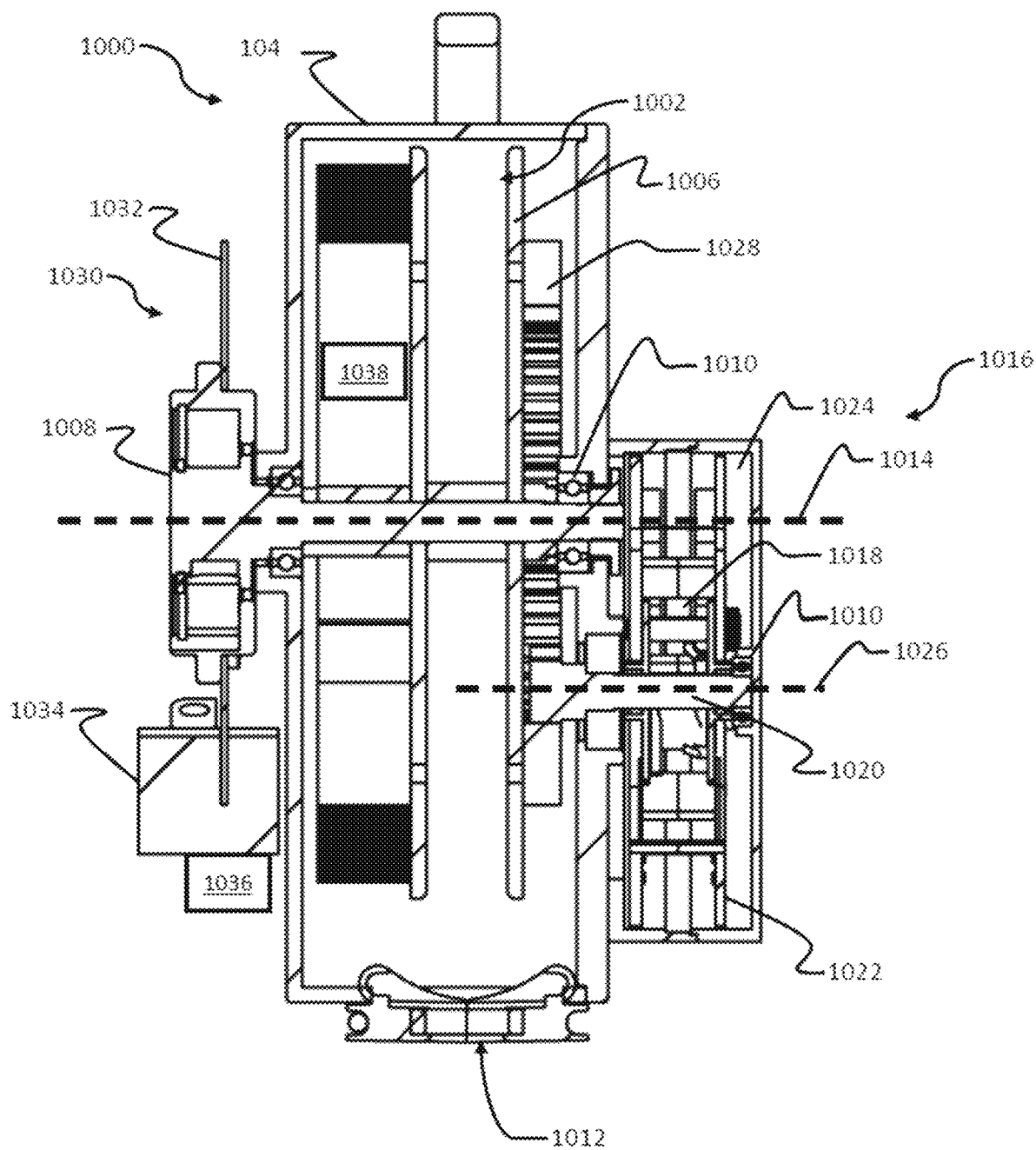
FIG. 13 is a cross-sectional view of the descent device shown in FIG. 12.

FIG. 12 is a perspective view of another automatic descent control device 1000 for use with the automatic descent control systems described above. FIG. 13 is a cross-sectional view of the descent device 1000. Referring concurrently to FIGS. 12 and 13, the descent device 1000 includes a line system 1002 disposed at least partially within a housing 1004. The line system 1002 includes a drum 1006 mounted on a first rotatable shaft 1008 that is rotatably supported by the housing 1004 by one or more bearings 1010. The line system 1002 also includes a line (not shown) that is configured to be attached to a climber. The line is wound at least partially around the drum 1006 and extends through an opening 1012 at the bottom of the housing 1004. The line retracts within the housing 1004 and winds about the drum 1006 when the line is not loaded and extends from the housing 1004 and unwinds about the drum 1006 when the line is loaded. As the line winds and unwinds the drum 1006, the drum 1006 rotates the first shaft 1008 about a first axis 1014.

The descent device 1000 includes a first braking system 1016 that couples to the first shaft 1008. In this example, the first braking system 1016 is an eddy current braking system and includes a disk 1018 mounted on a second rotatable shaft 1020 that is rotatably supported in the housing 1004 by one or more bearings 1010. The disk 1018 includes one or more conductors 1022, while one or more magnets 1024 are mounted to the housing 1004. Upon rotation of the disk 1018 about a second axis 1026, centrifugal forces are used to selectively pass the conductors 1022 through the magnetic field generated by the magnets 1024. The magnetic field resists this motion, thereby generating a braking force on the line and lowering the climber at a first descent rate. The first braking system 1016 is used in a normal operational configuration of the descent device 1000. One example of this type of eddy current braking system is described in U.S. Pat. No. 8,490,751 to Allington et al., issued Jul. 23, 2013, and that is hereby incorporated by reference herein in its entirety.

In the example, the first shaft 1008 is parallel to but offset from the second shaft 1020 and the shafts 1008, 1020 are coupled together by one or more gears 1028. The gears 1028 enable the first shaft 1008 to rotate at a different speed than the second shaft 1020. In other examples, the first shaft 1008 may rotate at the same speed of the second shaft 1020. In still other examples, the second shaft 1020 may be axially aligned or integrated with the first shaft 1008 so that the shafts 1008, 1020 can rotate at the same speed.

The descent device 1000 also includes an independent second braking system 1030 that couples to the first shaft 1008. In this example, the second braking system is a disk braking system and includes a rotor 1032 coupled to the first shaft 1008 and at least one caliper 1034 supported on the housing 1004. The second braking system 1030 also provides a braking force on the line and lowers the climber at a second descent rate. The second braking system 1030 is used in a lock-off operational configuration of the descent device 1000. A controller 1036 is coupled to the second braking system 1030 and selectively engages the second braking system 1030 when it is engaged and selectively actuates the calipers 1034 when generating the braking force. For example, and as described in detail in FIG. 1, the controller 1036 can receive an engagement signal so as to engage the second braking system 1030 for operation, and then once a sensor 1038 detects that the climber has fallen off of the wall, the second braking system 1030 is actuated by the controller 1036.

The engagement signal can be generated by a remote engagement button (not shown). Additionally, the sensor 1038 is coupled in communication with the controller 1036. The sensor 1038 can be a rotary encoder (as illustrated) to detect when the line is loaded and send an actuation signal to the controller 1036 for the second braking system 1030. In other examples, the sensor 1038 can be an accelerometer, a force gauge, as strain gauge, or a laser sensor as required or desired. In the example, the controller 1036 is an electronic controller with a circuit board having components that enable operation of the second braking system 1030 as described herein. A power source (not shown) is also included in the descent device 1000. In other examples, the controller 1036 can be a mechanical controller as required or desired.

In other examples, the second braking system 1030 can be mounted on the second shaft 1020. In still another example, the magnets 1024 of the first braking system 1016 can be coupled to a power source and form an electromagnet. The power flow to the electromagnet can then be modulated (e.g., by the controller 1036) to generate a braking force. In this example, a second braking system 1030 is not required, as the power flow can be used to operate the first braking system 1016 in both the normal operational configuration and the lock-off operational configuration. An increase in power would increase the braking force generated by the eddy current braking system. In yet another example, the second braking system 1030 may be a band brake. Examples of an electromagnetic brake and a band brake are described below in reference to FIGS. 14 and 15.

Figure 14:
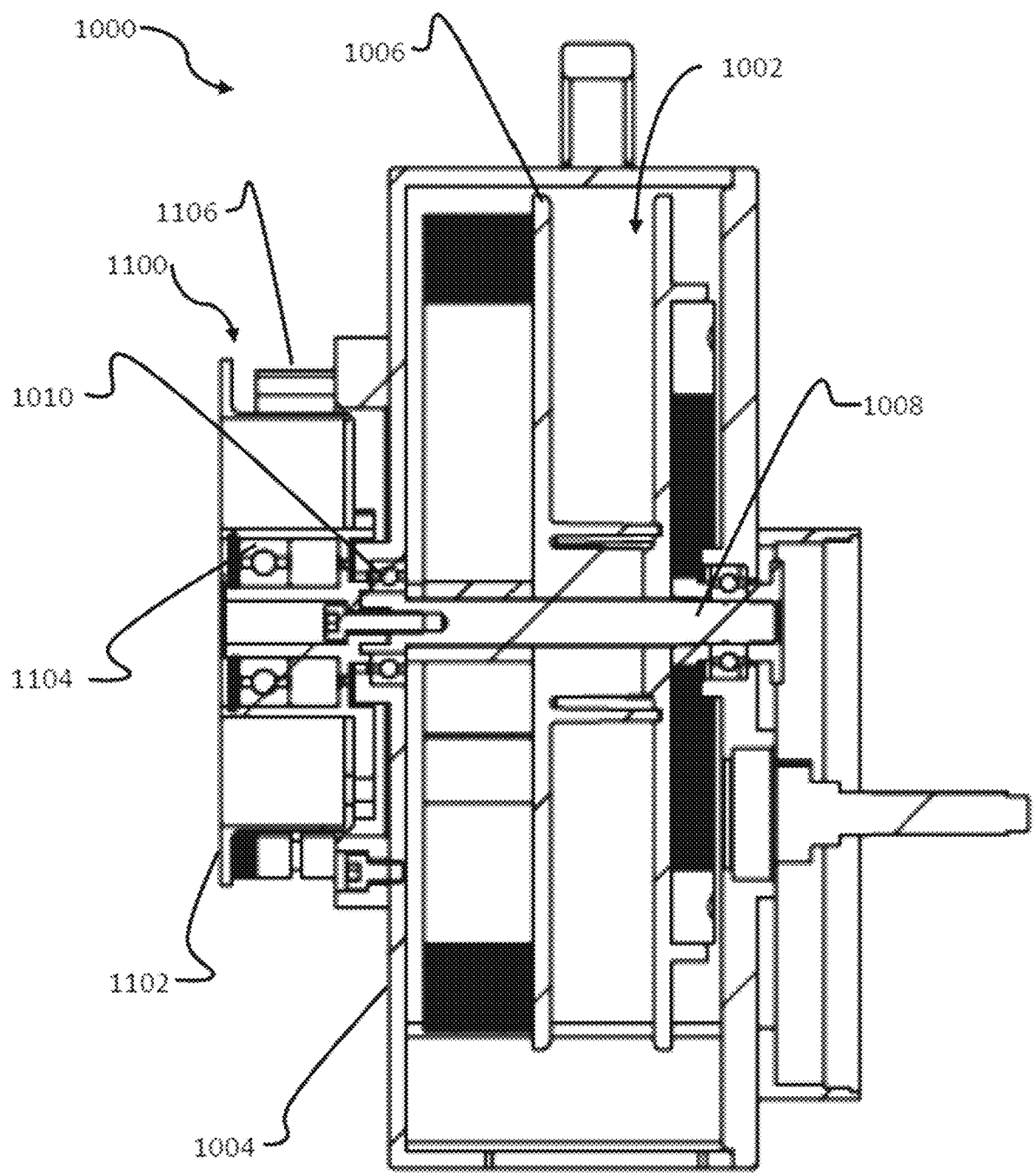
FIG. 14 is a partial cross-sectional view of the descent device shown in FIG. 12 with another second braking system.

FIG. 14 is a partial cross-sectional view of the descent device 1000 with a different second braking system 1100. As described above, the descent device 1000 includes the line system 1002 disposed at least partially within the housing 1004. The line system 1002 includes the drum 1006 mounted on the first rotatable shaft 1008 that is rotatably supported by one or more bearings 1010. The descent device 1000 can include the first braking system (not shown) that is an eddy current braking system to generate a braking force during operation. In this example, however, the independent second braking system 1100 is a band brake system and includes a drum 1102 coupled to the first shaft 1008 via a clutch/ball bearing 1104. A band brake pad 1106 is positioned radially outside of the drum 1102 and is coupled to an actuator (not shown). The actuator can move the band brake pad 1106 so as to apply a frictional brake to the drum 1102 and generate a braking force.

Figure 15:
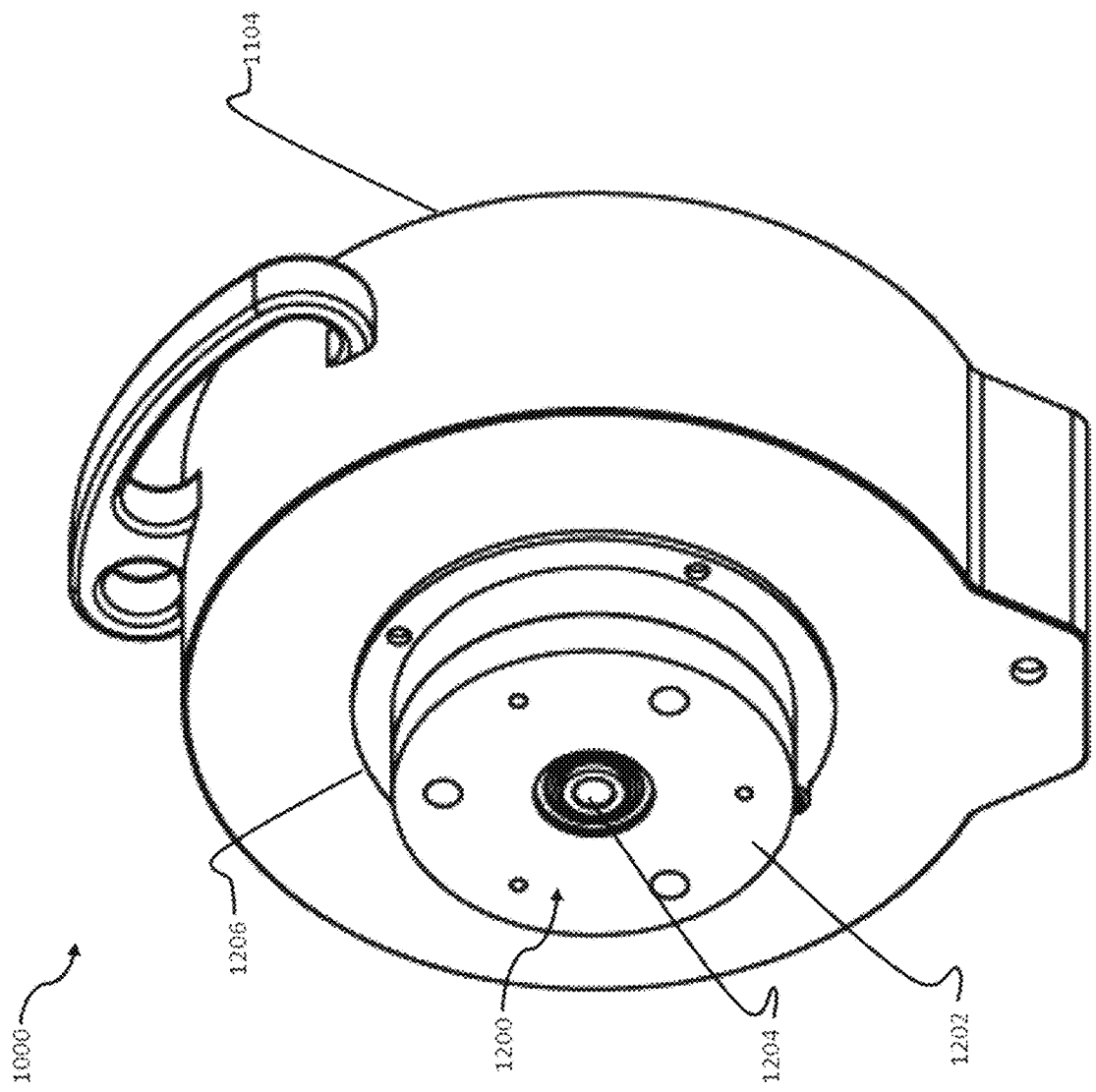
FIG. 15 is a perspective view of the descent device shown in FIG. 12 with yet another second braking system.

FIG. 15 is a perspective view of the descent device shown 1000 with another different second braking system 1200. As described above, the descent device 1000 includes the housing 1004 which encloses a line system (not shown) and has a first braking system (not shown) that is an eddy current braking system to generate a braking force during operation. In this example, however, the independent second braking system 1200 is an electromagnetic brake system and includes a rotating brake pad 1202 coupled to the first shaft via a hub 1204. The brake pad 1202 is positioned adjacent to an electromagnetic base 1206 that is coupled to the exterior of the housing 1004. In operation, electrical power can be applied to the base 1206 such that a magnetic field is created and the magnetic attraction pulls the brake pad 1202 in contact with the base 1206. The friction and the strength of the magnetic fields generates the braking force.

Figure 16:
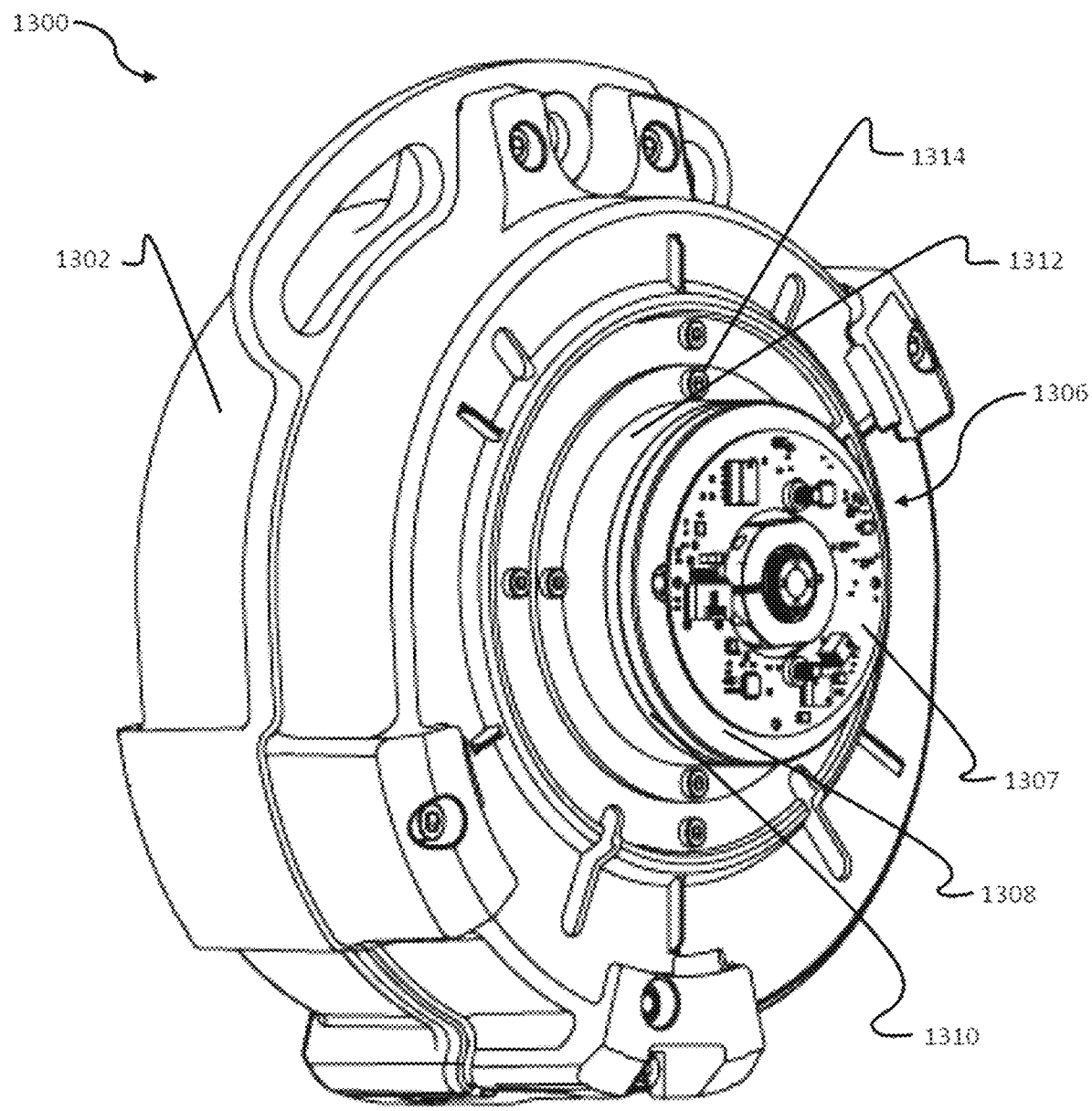
FIG. 16 is a perspective view of another automatic descent control device.

FIG. 16 is a perspective view of another automatic descent control device 1300 for use with the automatic descent control systems described above. As described above, the descent device 1300 includes a line system (not shown) disposed at least partially within a housing 1302. Within the housing 1302, a rotatable shaft 1304 (shown in FIG. 17) is supported and a first braking system (not shown) is coupled thereto. The first braking system is used in a normal operational configuration of the descent device 1300, and in the example, is an eddy current braking system. One example of this type of eddy current braking system is described in U.S. Pat. No. 8,490,751 to Allington et al. Furthermore, certain components disposed within the housing 1302 that enable operation of the first braking system of the descent device 1300 are described in detail in U.S. Provisional Application No. 62/991,467, filed Mar. 18, 2020, and that is hereby incorporated by reference herein in its entirety.

The descent device 1300 also includes an independent second braking system 1306 that couples to the housing 1302 and the rotatable shaft 1304. The second braking system 1306 can be removed from the housing 1302 and the shaft 1304 as required or desired. As described above, the second braking system 1306 also provides a braking force on the line and is configured to lower the climber at a second descent rate. The second braking system 1306 is used in a lock-off operational configuration of the descent device 1300 as described herein. As illustrated in FIG. 16, a housing of the second braking system 1306 is not illustrated so that some of the components therein are shown. The housing (not shown) is used to enclose the second braking system 1306 in a single system that can be coupled to the descent device housing 1302 as required or desired.

In the example, the second braking system 1306 is an electromagnetic brake system that uses an electromagnetic force to apply mechanical friction resistance to the shaft 1304. The braking system 1306 includes a controller 1307 that is configured to selectively engage the second braking system 1306 so as to generate the braking force. To generate the mechanical friction resistance, the braking system 1306 includes a brake hub 1308, a brake pad 1310, and a clamp wheel 1312. The clamp wheel 1312 can be coupled to the housing 1302 via one or more fasteners 1314 (e.g., bolts). The components of the second braking system 1306 are described in further detail below and in reference to FIGS. 17-19.

Figure 17:
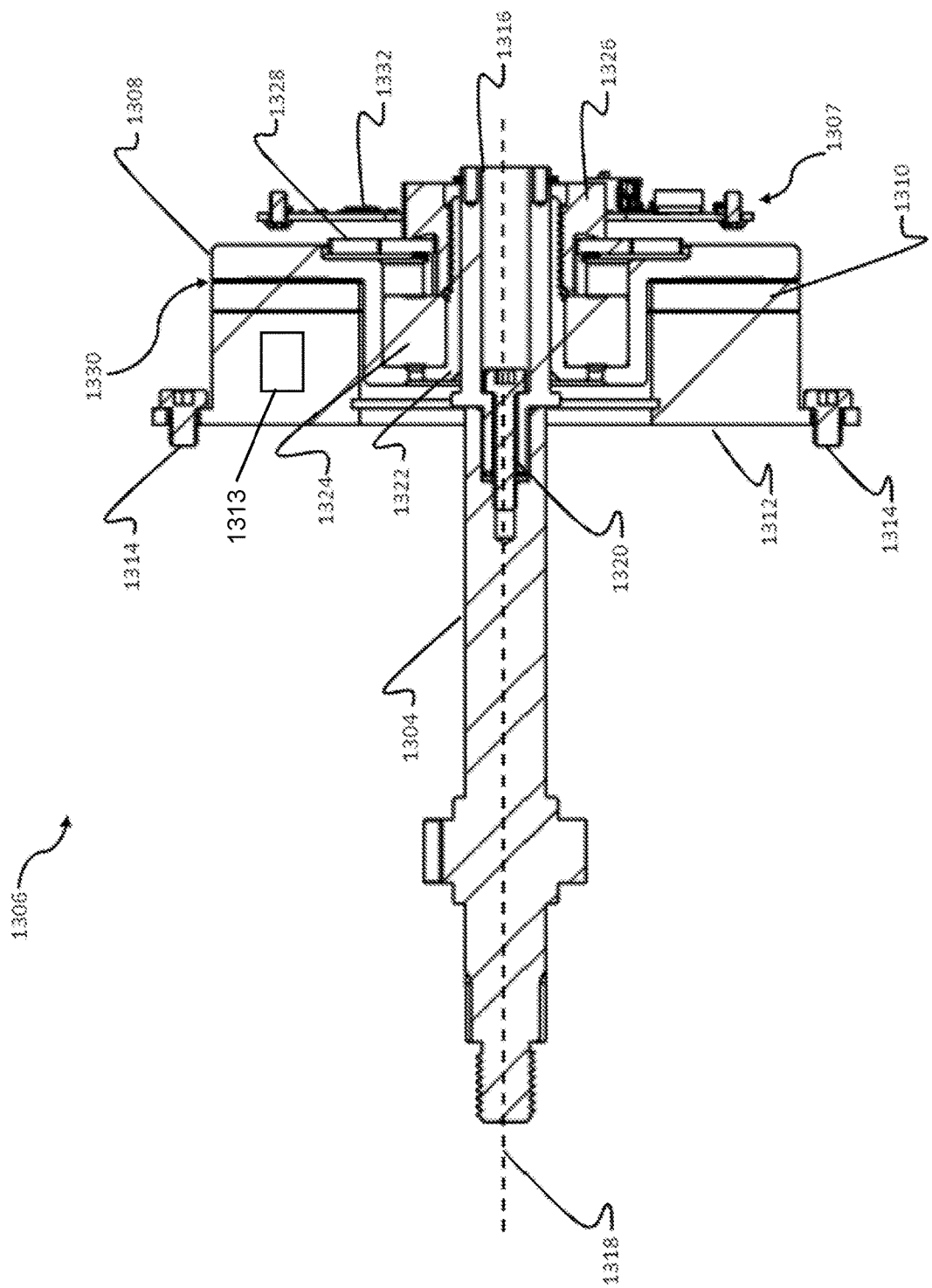
FIG. 17 is a cross-sectional view of a second braking system of the descent device shown in FIG. 16.
Figure 18:
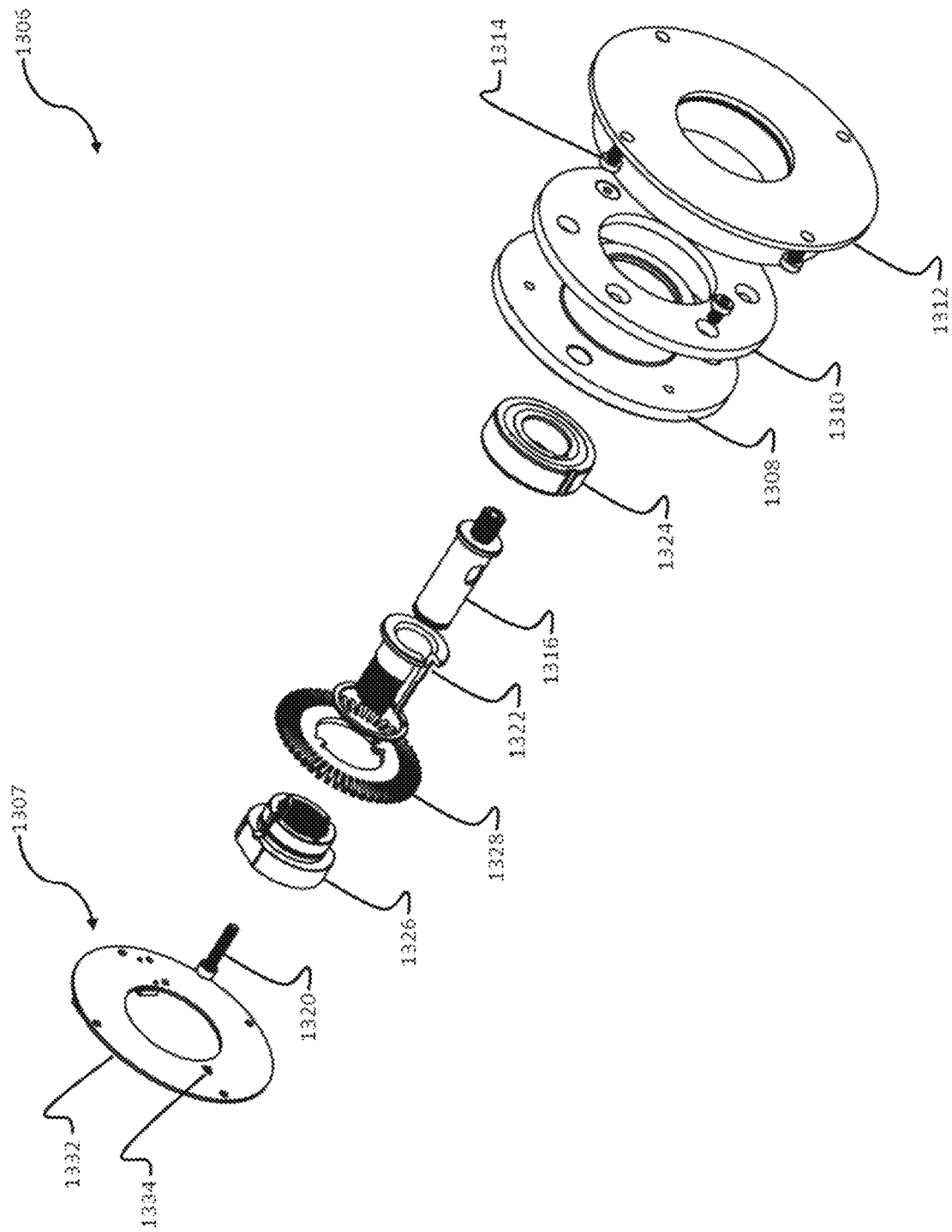
FIG. 18 is an exploded perspective view of the second braking system shown in FIG. 17.

FIG. 17 is a cross-sectional view of the second braking system 1306. FIG. 18 is an exploded perspective view of the second braking system 1306. Referring concurrently to FIGS. 17 and 18, the second braking system 1306 is configured to couple to the descent device 1300 (shown in FIG. 16). In the example, the descent device includes the rotatable shaft 1304 that has one end accessible through the housing 1302 (shown in FIG. 16). The braking system 1306 includes a lockoff plug shaft 1316 that is configured to couple to the rotatable shaft 1304 so that rotation of the rotatable shaft 1304 about a rotation axis 1318 drives corresponding rotation of the plug shaft 1316 around the rotation axis 1318. In the example, the plug shaft 1316 and the rotatable shaft 1304 are coaxial along the axis 1318. In an aspect, the plug shaft 1316 and the rotatable shaft 1304 are coupled together via a spline coupling so that direct rotation of the shaft 1304 drives direct corresponding rotation of the plug shaft 1316. Additionally or alternatively, a fastener 1320 can be used to further secure the rotatable shaft 1304 and the plug shaft 1316 together.

A rotor assembly of the second braking system 1306 is coupled to the plug shaft 1316 and includes a collet 1322 that supports a clutch bearing 1324. A collar 1326 is used to secure the clutch bearing 1324 on the collet 1322. The brake hub 1308 is coupled to the clutch bearing 1324 so that the brake hub 1308 is rotatable around the rotation axis 1318 and driven by the rotatable shaft 1304. A reluctor wheel 1328 is coupled to the collar 1326 so that the reluctor wheel 1328 is also rotatable around the rotation axis 1318 and driven by the rotatable shaft 1304. A stator assembly of the second braking system 1306 is coupled to the housing 1302 (shown in FIG. 16) via the fasteners 1314 and includes the clamp wheel 1312. Supported on the clamp wheel 1312 is the brake pad 1310. The brake pad 1310 is disposed adjacent to the brake hub 1308 with a gap 1330 therebetween.

The second braking system 1306 also includes the controller 1307. In an aspect, the controller 1307 is coupled to the housing (not shown) of the braking system 1306 that encloses the rotor and stator assemblies. In this example, the controller 1307 includes a printed circuit board (PCB) 1332 that is configured to enable operation of the second braking system 1306 as described herein. The controller 1307 is coupled in electric communication with the clamp wheel 1312 so that voltage can be applied and a magnetic field can be generated. The PCB 1332 includes one or more sensors 1334 that are configured to read the rotational speed and/or direction of the reluctor wheel 1328. In an aspect, the reluctor wheel 1328 is ferromagnetic and the sensor 1334 is a magnetic sensor (either active or passive). The PCB 1332 can also include any other electrical based component as required or desired. For example, the PCB 1332 can have memory and a processor so as to process algorithms and/or control loops that enable function of the descent device 1300 and the braking system 1306 as described herein. The PCB 1332 can have one or more communication components for wired or wireless communication. For example, selective engagement of the braking system 1306 via the engagement device (e.g., a button) or a control station. In other examples, the communication components can send operational data from the descent device 1300 and the braking system 1306 as required or desired. For example, a number and/or or time of user's climbs, etc.

In aspects, the controller 1307 and the associated components can enable the descent device 1300 to record line inspections. For example, a line inspection would have a unique rotation to the drum when compared to normal operation, thereby enabling the identification of how many line inspections occur (e.g., a total number or a number over a period of time). In another aspect, the descent device 1300 can record the number of descents by users. For example, this use based data can be used during device recertification procedures. In other examples, frequency of usage can be determined so that owners can more efficiently set up climbing walls and number of descent devices. In still other examples, the descent device 1300 can send real time usage information to other devices. This enables for owners to optimize descent devices based on actual climber usage and/or allow climbers to participle in virtual games or climbing competitions. In yet another aspect, the descent device 1300 can detect the weight of climbers because different weights will have unique descent profiles. In examples, this used based data can be used to help determine harnesses sizes to use and purchase. In still other aspects, the descent device 1300 can determine overload conditions. For example, climber weights that are greater than or equal to a maximum load rating on the device, or slack jumps whereby a climber pulls out slack on the line and jumps onto the device catching the jump. It should be appreciated that other functions are also contemplated herein.

In operation, the descent device 1300 includes a first braking system (not shown) that is an eddy current brake system, although, any other braking system described herein may be utilized, for use in a normal operational configuration. In this configuration, the components of the first braking system are coupled to and disposed around the rotatable shaft 1304 such that the rotatable shaft 1304 rotates as the user climbs and descends. Additionally, the second braking system 1306 is disengaged so that no additional braking forces are generated on the shaft 1304. However, because the reluctor wheel 1328 is coupled to the rotatable shaft 1304 and rotates therewith, the controller 1307 can collect and/or transmit data during the normal operational configuration as required or desired.

The second braking system 1306, when engaged, also provides a braking force on the rotatable shaft 134 and is utilized to lower the climber at a second and different descent rate (e.g., slower or stopped) while in a lock-off operational configuration. In the lock-off operational configuration, the controller 1307, via the sensor 1334 and the reluctor wheel 1328 detects rotation direction and speed of the rotatable shaft 1304. Based on the detection of the movement of the shaft 1304, the controller 1307 selectively channels an electric current or voltage to the clamp wheel 1312. The clamp wheel 1312 includes an electric coil 1313 such that when power is applied, a magnetic field is generated. The magnetic field attracts the brake hub 1308 that is ferromagnetic, so as to close the gap 1330 between the brake pad 1310 and the brake hub 1308, and thereby, inducing a frictional braking force on the rotatable shaft 1304. The amount of power supplied to the clamp wheel 1312 can control the amount of frictional braking force applied to the system. The brake pad 1310 can be replaceable so as to extend the life-span of the second braking system 1306. To release the brake hub 130 and the frictional braking force, power can be removed from the clamp wheel 1312 and the magnetic field removed. The clutch bearing 1324 is used to provide some slip and damping to the coupling between the brake hub 1308 and the rotatable shaft 1304 so as to increase the life-span of the components and reduce wear.

Figure 19:
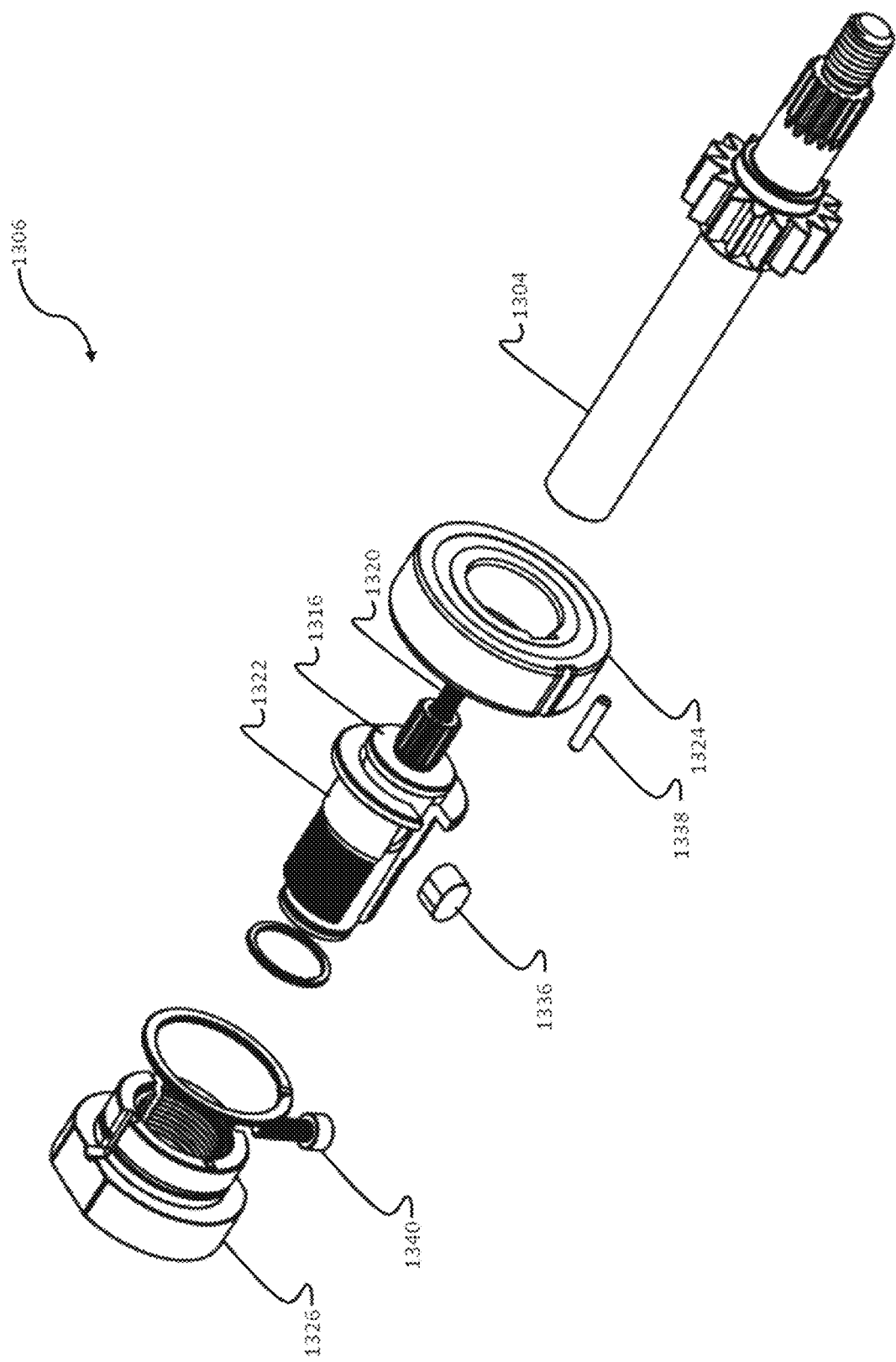
FIG. 19 is a partial exploded perspective view of the second braking system shown in FIGS. 17 and 18.

FIG. 19 is a partial exploded perspective view of the second braking system 1306. Certain components are described above, and thus, are not necessarily described further. The collet 1322 is coupled to the plug shaft 1316 by a first key 1336 so that rotational movement can be transferred between the two. The clutch bearing 1324 is also coupled to the collet 1322 by the first key 1336 so that rotational movement can be transferred between the two. A second key 1338 is used to couple the brake hub 1308 (shown in FIGS. 17 and 18) to the clutch bearing 1324 so that rotational movement can be transferred between the two. The first and second keys 1336, 1338 are different sizes so that assembly of the rotor assembly is more efficient (e.g., during maintenance). The collar 1326 is secured by a fastener 1340 (e.g., bolt) so as to hold the other components on the plug shaft 1316 and so that the rotor assembly can be rotatably driven by the shaft 1304.

The electromagnetic brake in FIGS. 16-19 is a system that can easily be coupled to a shaft of a descent device so as to provide lock-off operations as described herein. By self-containing all of the components needed for the lock-off operations, modifications of the original descent control device are reduced or eliminated entirely. For example, the second braking system 1306 can easily be attached and removed as required or desired. Additionally, the electronic controller 1307 provides an electronic monitoring system for operation of the descent device and the second braking system. This enables for operations of the descent device to be more easily monitored and user based data to be collected. For example, the number of user's climbs and falls can be counted, an operational service time can be measured, climbing speeds can be measured, etc. so that performance of the descent device is increased.

Figure 20:
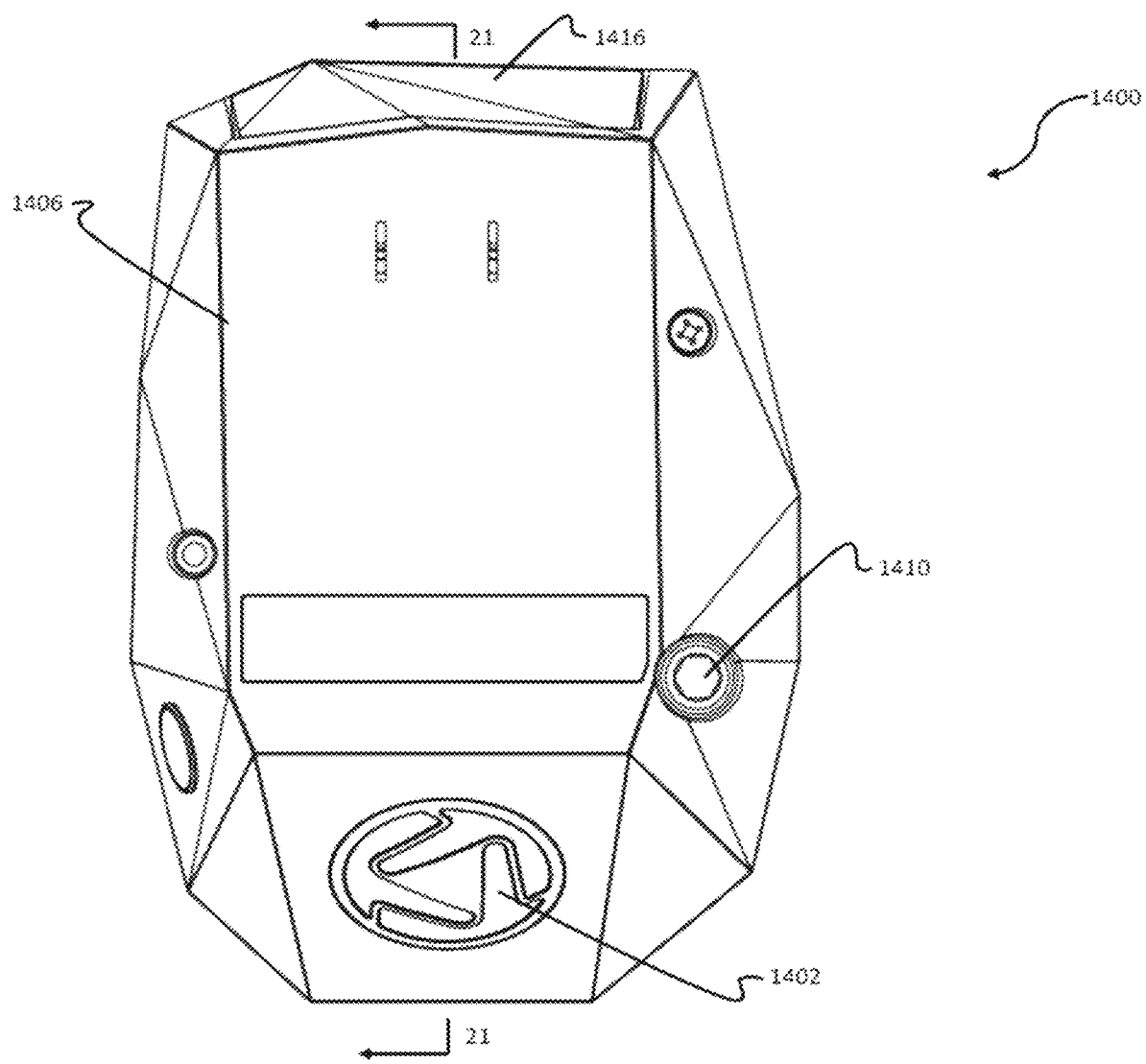
FIG. 20 is a front view of an exemplary interface hold.
Figure 21:
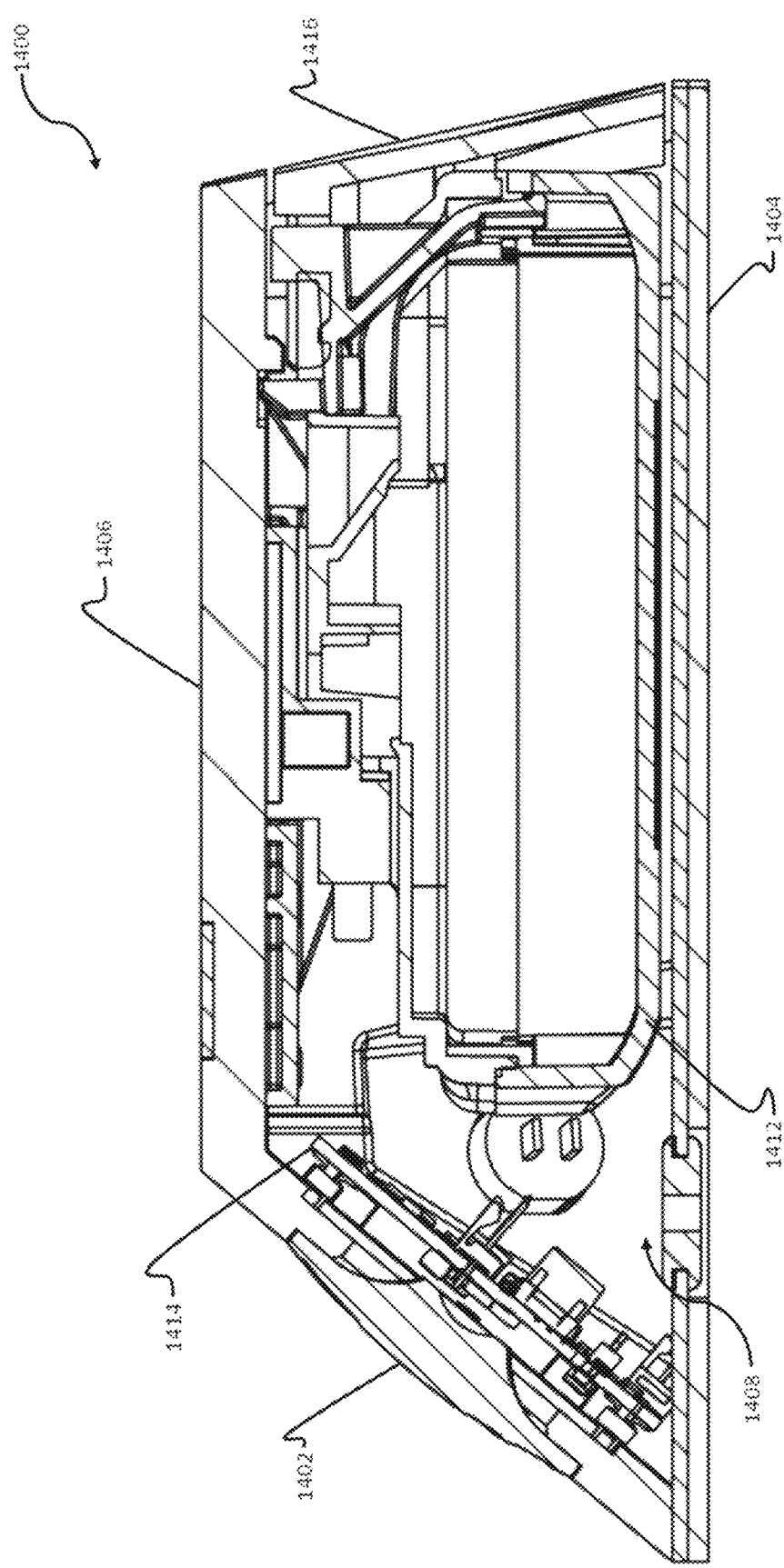
FIG. 21 is a perspective cross-sectional view of the interface hold shown in FIG. 20 and taken along line 21-21.

FIG. 20 is a front view of an exemplary interface hold 1400. FIG. 21 is a perspective cross-sectional view of the interface hold 1400 taken along line 21-21. Referring concurrently to FIGS. 20 and 21, the interface hold 1400 is one example of an engagement device described herein that enables the descent device to be remotely switched between the normal operational configuration and the lock-off operational configuration. In the example, the interface hold 1400 is configured to couple in communication with the descent devices described herein. The interface hold 1400 includes one or more buttons 1402 that when actuated (e.g., pressed) remotely engages the lock-off operational configuration of the descent device. In some examples, the interface hold 1400 can wirelessly couple to the descent device (e.g., via Wi-Fi or Bluetooth) so as to engage the lock-off operational configuration. In the illustrated example, the interface hold 1400 can be wired to the descent device so that the interface hold 1400 can also be used as a power source for the descent device and the braking system(s) disposed therein. For example, an electrical wire (not shown) may extend between the descent device and the interface hold 1400 and along a backside of a climbing wall so that it is not accessible to the climbers.

The interface hold 1400 also includes a mount plate 1404 and a housing cover 1406 that removably couples thereto, and which define an interior chamber 1408 therein. The interface hold 1400 is configured to mount on a climbing wall, for example, by one or more holes 1410 that are shaped and sized to receive a bolt (not shown) which secures to the climbing wall. In an aspect, the interface hold 1400 may be coupled towards a bottom of the climbing wall so that the climber can engage the lock-off operational configuration as required or desired at the start of the climb. The interface hold 1400 may also be configured to support the climber as required or desired. The housing cover 1406 has an outer surface having a plurality of oblique surfaces such that the interface hold 1400 can be distinguished from other climbing holds known in the art. It should be appreciated that the interface hold 1400 can take any other shape as required or desired, including shapes that correspond to known climbing holds. In the example, the button 1402 is disposed at the bottom of the housing cover 1406, however, other locations are contemplated herein. Additionally, the housing cover 1406 may include a visual indicator (e.g., LED light, display screen, or the like) that enables the system to indicate the operational configuration of the descent device and/or any other status condition of the descent device (e.g., on/off, etc.).

Within the interior chamber 1408, the interface hold 1400 includes a power source 1412 and a controller 1414. In an aspect, the power source 1412 can be a replaceable battery pack or a rechargeable battery pack (e.g., with a port for charging). In other aspects, the power source 1412 may be a coupling to an exterior power source such as line power for a building/structure or a generator. In the example, a removable cover 1416 may be used to access the power source 1412. In an aspect, the cover 1416 is disposed at the top of the housing cover 1406, however, other locations are contemplated herein. The controller 1414 is disposed adjacent to the button 1402 and includes any number of electronic components that enable function of the system as described herein. For example, the controller 1414 enables communication with the descent device and for power to be supplied thereto. It should be appreciated, however, that in other examples, the descent device may have its own power source as required or desired. In some aspects, the interface hold 1400 can be water resistant for use with outdoor climbing walls.

The automatic descent control systems described herein enable any number of climbing wall layouts to be adapted for allowing a lock-off operational configuration to be engaged so that a climber is allowed to hang above a ground surface without being lowered all the way to the ground surface. For example, an engagement device can be mounted on a climbing wall for the climber to engage the lock-off operational configuration. In another example, a control system can be used so that a belayer can control the lock-off operational configuration. Additionally, a sensor device can be used so that while in the lock-off operational configuration, a braking system is actuated to generate a braking force. The sensor device can monitor any number of components including the line and the braking system. For example, the sensor device can be any one of an encoder, accelerometer, force gauge, strain gauge, laser sensor, camera, etc. Further, the systems may still operate normally to allow the climber to be lowered all the way to the ground surface in a normal operational configuration as required or desired.

The descent devices described herein can either include a single braking system that can change operational configurations or have two separate braking systems, one for each operational configuration. Examples of a single braking system include a motor attached to a line. In some examples, a gear reduction or a transmission can be used to selectively control the descent rate of the climber. Using two separate braking systems enables existing descent devices, such as, fan braking systems, friction braking systems, hydraulic braking systems, and magnetic braking systems, to be adapted to allow the climber to hang above the ground surface in the lock-off operational configuration.

It will be clear that the systems and methods described herein are well adapted to attain the ends and advantages mentioned as well as those inherent therein. Those skilled in the art will recognize that the methods and systems within this specification may be implemented in many manners and as such is not to be limited by the foregoing exemplified embodiments and examples. In this regard, any number of the features of the different embodiments described herein may be combined into one single embodiment and alternate embodiments having fewer than or more than all of the features herein described are possible. It is to be understood that terminology employed herein is used for the purpose of describing particular examples only and is not intended to be limiting. It must be noted that, as used in this specification, the singular forms "a," "an," and "the" include plural referents unless the context clearly dictates otherwise.

While various embodiments have been described for purposes of this disclosure, various changes and modifications may readily suggest themselves to those skilled in the art and may be made which are well within the scope of the present disclosure.

What is claimed is:

1. An automatic descent control device comprising:
    a housing;
    a shaft rotatably supported within the housing, the shaft defining a rotation axis;
    a line configured to be attached to a load;
    a line system supported on the shaft and coupled to the line, the line system configured to retract the line within the housing and wind about the shaft when the line is not loaded and extend the line from the housing and unwind about the shaft when the line is loaded;
    a first braking system coupled to the line system, the first braking system having a first rotor assembly coupled to the shaft and rotatable around the rotation axis and a first stator assembly coupled to the housing, wherein the first braking system provides a first braking force when the line is loaded, wherein the first braking system lowers the load at a first descent rate; and
    a electromechanical braking system coupled to the line system, the electromechanical braking system having a second rotor assembly coupled to the shaft and rotatable around the rotation axis and a second stator assembly coupled to an exterior of the housing, wherein the electromechanical braking system provides a second braking force when the line is loaded, wherein the electromechanical braking system lowers or locks the load at a second descent rate, and wherein the load is a constant, and the first descent rate is greater than the second descent rate; and
    a controller coupled to the electromechanical braking system, wherein the controller selectively engages the electromechanical braking system upon receiving an engagement signal, the electromechanical braking system independent from the first braking system.

2. The automatic descent control device of claim 1, wherein the second descent rate locks the position of the line and prevents the load from lowering.

3. The automatic descent control device of claim 1, wherein the controller automatically switches from the electromechanical braking system to the first braking system upon a predetermined time period.

4. The automatic descent control device of claim 1, wherein the first braking system comprises one of a fan braking system, a friction braking system, a hydraulic braking system, an electromagnetic braking system, or a magnetic braking system.

5. The automatic descent control device of claim 1, wherein the controller is one of an electronic controller or a mechanical controller.

6. An automatic descent control device comprising:
    a housing;
    a shaft rotatably supported within the housing, the shaft defining a rotation axis;
    a line configured to be attached to a load, wherein the line is coupled to the shaft, and wherein the line retracts within the housing and winds about the shaft when the line is not loaded, and extends from the housing and unwinds about the shaft when the line is loaded;
    a first braking system coupled to the shaft, the first braking system having a first rotor assembly coupled to the shaft and rotatable around the rotation axis and a first stator assembly coupled to the housing, wherein the first braking system provides a first braking force to the shaft when the line is loaded, and wherein the first braking system lowers the load at a first descent rate;
    an electromechanical braking system coupled to the shaft, the electromechanical braking system having a second rotor assembly coupled to the shaft and rotatable around the rotation axis and a second stator assembly coupled to an exterior of the housing, wherein the electromechanical braking system provides a second frictional braking force to the shaft when the line is loaded, wherein the electromechanical braking system lowers or locks the load at a second descent rate, and wherein the load is a constant, and the first descent rate is greater than the second descent rate; and
    a controller coupled to the electromechanical braking system, wherein the controller engages the electromechanical braking system upon receiving an engagement signal, the electromechanical braking system independent from the first braking system.

7. The automatic descent control device of claim 6, wherein the first braking system is an eddy current braking system.

8. The automatic descent control device of claim 6, wherein the electromechanical braking system comprises:
    a plug shaft configured to couple to the shaft;
    a clutch bearing coupled to the plug shaft;
    a brake hub coupled to the clutch bearing, wherein the plug shaft, the clutch bearing, and the brake hub form at least a portion of the second rotor assembly and are all co-axial and all rotatably driven by the shaft;
    a clamp wheel coupled to the housing; and a brake pad coupled to the clamp wheel, wherein the clamp wheel and the brake pad form at least a portion the second stator assembly.

9. The automatic descent control device of claim 8, wherein the clamp wheel comprises an electric coil configured to generate a magnetic field.

10. The automatic descent control device of claim 6, wherein the electromechanical braking system comprises:
    a reluctor wheel; and
    a sensor, wherein the sensor is configured to measure rotational speed and direction of the shaft via the reluctor wheel.

11. The automatic descent control device of claim 6, further comprising a remote interface hold coupled in communication with the descent control device, wherein the interface hold comprises a power source configured to provide power to the electromagnetic braking system.

12. A secondary braking system for an automatic descent control device configured to generate a first braking force relative to a rotatable shaft rotatable around a rotation axis via a primary braking system, the secondary braking system independent from the primary braking system, the secondary braking system comprising:
    a plug shaft configured to couple to the rotatable shaft of the automatic descent control device and rotation driven therefrom, the plug shaft rotatable around the rotation axis of the rotatable shaft;
    a rotor assembly coupled to the plug shaft;
    a stator assembly fixed relative to the rotor assembly and configured to be supported on the automatic descent control device; and
    a controller coupled to the secondary braking system, wherein the controller selectively engages the second braking system upon receiving an engagement signal, wherein the rotor assembly and the stator assembly are configured to generate a second braking force relative to the rotatable shaft through the plug shaft, and wherein the second braking force lowers or locks a load at a descent rate that is different than the first braking force, and wherein the plug shaft is configured to rotate around the rotation axis with the rotatable shaft when the secondary braking system is disengaged.

13. The secondary braking system of claim 12, wherein the second braking force is friction based.

14. The secondary braking system of claim 12, wherein the rotor assembly comprises:
    a clutch bearing coupled to the plug shaft; and
    a brake hub coupled to the clutch bearing, wherein the plug shaft, the clutch bearing, and the brake hub are all co-axial and all rotatably driven by the rotatable shaft.

15. The secondary braking system of claim 12, wherein the stator assembly comprises:
    a clamp wheel coupled to the housing; and
    a brake pad coupled to the clamp wheel.

16. The secondary braking system of claim 12, wherein the controller is configured to measure rotational speed and direction of the rotatable shaft via a reluctor wheel.

* * * * *